(12) United States Patent
Stephens et al.

(10) Patent No.: US 11,663,551 B2
(45) Date of Patent: May 30, 2023

(54) TRACKING UNIQUE IN-GAME DIGITAL ASSETS USING TOKENS ON A DISTRIBUTED LEDGER

(71) Applicant: Sony Interactive Entertainment Inc., Tokyo (JP)

(72) Inventors: Mischa Stephens, San Mateo, CA (US); Warren Benedetto, Aliso Viejo, CA (US); Foley Laiyemo, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 16 days.

(21) Appl. No.: 17/315,005

(22) Filed: May 7, 2021

(65) Prior Publication Data
US 2022/0358450 A1 Nov. 10, 2022

(51) Int. Cl.
*G06Q 10/087* (2023.01)
*G06F 16/27* (2019.01)
(Continued)

(52) U.S. Cl.
CPC ........... *G06Q 10/087* (2013.01); *A63F 13/71* (2014.09); *A63F 13/79* (2014.09); *G06F 16/27* (2019.01);
(Continued)

(58) Field of Classification Search
CPC ....... G06Q 10/087; G06F 16/27; A63F 13/71; A63F 13/79; H04L 9/3213; H04L 9/3236; H04L 9/50; H04L 2209/60
(Continued)

(56) References Cited

U.S. PATENT DOCUMENTS 10,946,283 B1   3/2021 Meilich et al.
11,392,947 B1 * 7/2022 Prasad ............... G06Q 20/4014
(Continued)

FOREIGN PATENT DOCUMENTS

CN    107563761 A    1/2018
CN    110270097 A    9/2019
(Continued)

OTHER PUBLICATIONS

PCT/US22/24670, Tracking Unique In-Game Digital Assets Using Tokens on a Distributed Ledger, Apr. 13, 2022.
(Continued)

*Primary Examiner* — Garcia Ade
(74) *Attorney, Agent, or Firm* — Polsinelli LLP

(57) ABSTRACT

A system and method for tracking digital assets associated with video games. The digital assets may be in-game digital assets, such as in-game items or characters. The digital assets may be video game digital media assets representing moments of gameplay of a video game, such as video clips or images. The digital asset is created, and a distributed ledger tracking a history of the digital asset is created and stored across devices. A unique token for the digital asset can include a unique identifier and metadata identifying properties of the digital asset. Changes to properties of the digital asset, such as ownership, visual appearance, or metadata, can be identified in a request to update the history. A new block can be generated for, and appended to, the distributed ledger identifying the changes to the history of the digital asset. The new block can include hashes of previous blocks.

20 Claims, 19 Drawing Sheets

(51) Int. Cl.
*A63F 13/71* (2014.01)
*A63F 13/79* (2014.01)
*H04L 9/32* (2006.01)
*H04L 9/00* (2022.01)

(52) U.S. Cl.
CPC .......... *H04L 9/3213* (2013.01); *H04L 9/3236* (2013.01); *H04L 9/50* (2022.05); *H04L 2209/60* (2013.01)

(58) Field of Classification Search
USPC .......................................................... 705/28
See application file for complete search history.

(56) References Cited

U.S. PATENT DOCUMENTS

| | | | |
|---|---|---|---|
| 2014/0108263 | A1 | 4/2014 | Ortiz et al. |
| 2015/0371295 | A1 | 12/2015 | Gill et al. |
| 2017/0005804 | A1 | 1/2017 | Zinder |
| 2017/0103391 | A1 | 4/2017 | Wilson et al. |
| 2017/0232300 | A1* | 8/2017 | Tran ................. A63B 71/06 434/247 |
| 2017/0344987 | A1 | 11/2017 | Davis |
| 2017/0346693 | A1 | 11/2017 | Dix et al. |
| 2018/0013567 | A1 | 1/2018 | Davis |
| 2018/0144292 | A1 | 5/2018 | Mattingly et al. |
| 2018/0189528 | A1 | 7/2018 | Hanis et al. |
| 2018/0197172 | A1 | 7/2018 | Coburn et al. |
| 2019/0232172 | A1 | 8/2019 | Malan |
| 2019/0282906 | A1* | 9/2019 | Yong ................. G06Q 20/3825 |
| 2019/0299105 | A1* | 10/2019 | Knight ................. H04L 9/3247 |
| 2020/0184041 | A1 | 6/2020 | Andon et al. |
| 2020/0192957 | A1 | 6/2020 | Augustine et al. |
| 2022/0355208 | A1 | 11/2022 | Stephens |

FOREIGN PATENT DOCUMENTS

| | | |
|---|---|---|
| CN | 111544890 A | 8/2020 |
| EP | 3765981 | 1/2021 |
| JP | 2021-518592 | 8/2021 |
| WO | WO 2019/177713 | 9/2019 |
| WO | WO 2022/235403 | 11/2022 |

OTHER PUBLICATIONS

European Application No. 19767701.6 Extended European Search Report dated Nov. 30, 2021.
U.S. Appl. No. 17/315,127, Mischa Stephens, Tracking Unique Video Game Digital Media Assets Using Tokens on a Distributed Ledger, May 7, 2021.
Antonopoulos, Andreas M.; "Mastering Bitcon", Dec. 2014, 1st Edition.
PCT Application No. PCT/US2019/016799 International Preliminary Report on Patentability dated Sep. 15, 2020.
PCT Application No. PCT/US2019/016799 International Search Report and Written Opinion dated May 6, 2019.
U.S. Appl. No. 15/921,471 Office Action dated Mar. 30, 2021.
U.S. Appl. No. 15/921,471 Final Office Action dated Oct. 30, 2020.
U.S. Appl. No. 15/921,471 Office Action dated Mar. 19, 2020.
Ledger, "Blockchain and Games: A Match Made in Heaven?" Sep. 22, 2020, Retrieved on Jun. 24, 2022.
PCT Application No. PCT/US2022/024670 International Search Report and Written Opinion dated Jul. 20, 2022.
U.S. Appl. No. 17/315,127 Office Action dated Sep. 14, 2022.
Chinese Application No. 202010166870.1 First Office Action dated Dec. 26, 2022.

* cited by examiner

| Object | Events |
|---|---|
| 251 — Activity | activityAvailabilityChange (id[])<br>activityStart (id,location)<br>activityEnd(id,outcome,location) |
| 252 — Zone | locationChange (id,location) |
| 254 — Actor | actorSelect (id[]) |
| 256 — Mechanic | mechanicAvailabilityChange (id[])<br>mechanicInventoryChange (id[])<br>mechanicLoadoutChange (id[])<br>mechanicUse (id[],')<br>mechanicImpact (id') |
| 258 — Game Media | gameMediaUnlock (id)<br>gameMediaStart (id)<br>gameMediaEnd (id) |

*FIG. 2B*

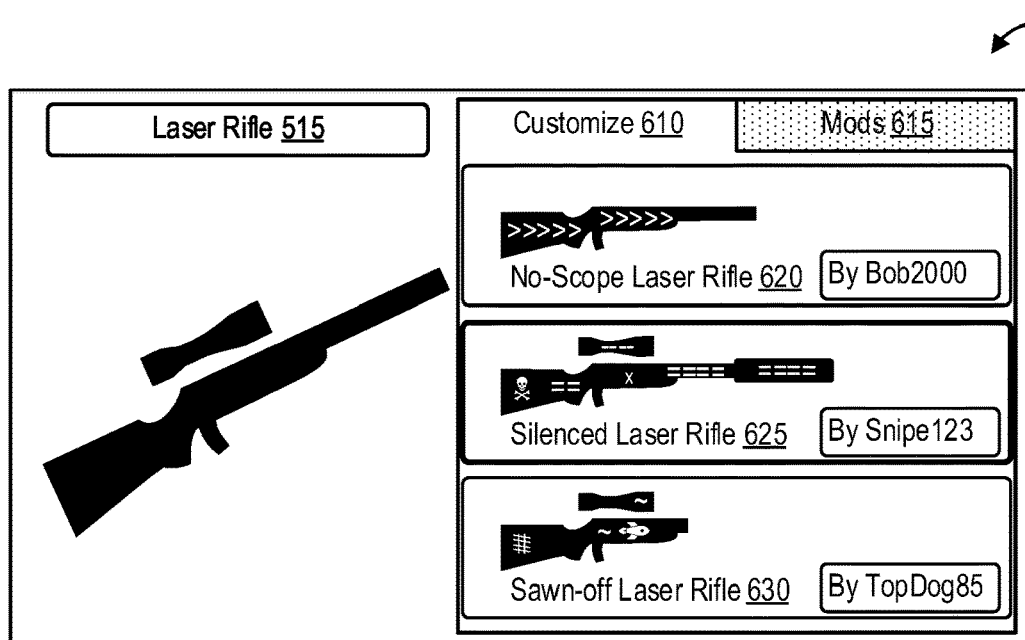
*FIG. 6A*
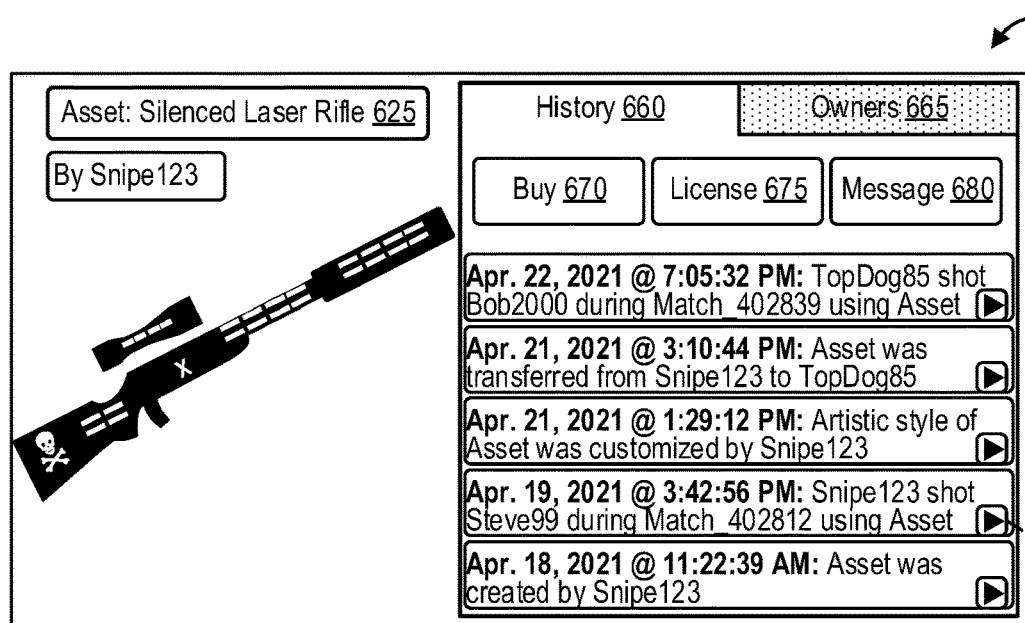
*FIG. 6B*
Video Game Digital Media Asset 690
(e.g., image or video clip depicting the shot)

Marketplace 805 for In-Game Digital Assets 810

In-Game Items 815:

No-Scope Laser Rifle 620
Stats: "Space Wars," -2 Acc, +1 Dmg
- By Bob2000 | Buy ($25)
- Message | Rent ($5/day)
- See History | Quantity: 5

Silenced Laser Rifle 625
Stats: "Space Wars," +1 Stlth
- By Snipe123 | Buy ($70)
- Message | Rent ($9/day)
- See History | Quantity: 1

Sawn-off Laser Rifle 630
Stats: "Space Wars," -3 Acc, +4 Dmg
- By TopDog85 | Buy ($35)
- Message | Rent ($7/day)
- See History | Quantity: 2

Spicy Herb
Stats: "ActionTime" +2 Hlth, +1 Dmg
- By TopDog85 | Buy ($8)
- Message | Rent ($2/day)
- See History | Quantity: 23

In-Game Costumes 820:

Top Hat
Stats: "Space Wars," +1 Chrsm
- By Bob2000 | Buy ($17)
- Message | Rent ($3/day)
- See History | Quantity: 1

Explorer Outfit
Stats: "Space Wars," +2 Def
- By Snipe123 | Buy ($5)
- Message | Rent ($1/day)
- See History | Quantity: 80

In-Game Areas 825:

Custom Level: Factory
Stats: "Space Wars," Duel Arena
- By Ashley33 | Buy ($17)
- Message | Rent ($3/day)
- See History | Quantity: 30

Custom World: Future Earth
Stats: "ActionTime," 1P level set
- By Ashley33 | Buy ($15)
- Message | Rent ($2/day)
- See History | Quantity: 50

*FIG. 8A*

FIG. 8B

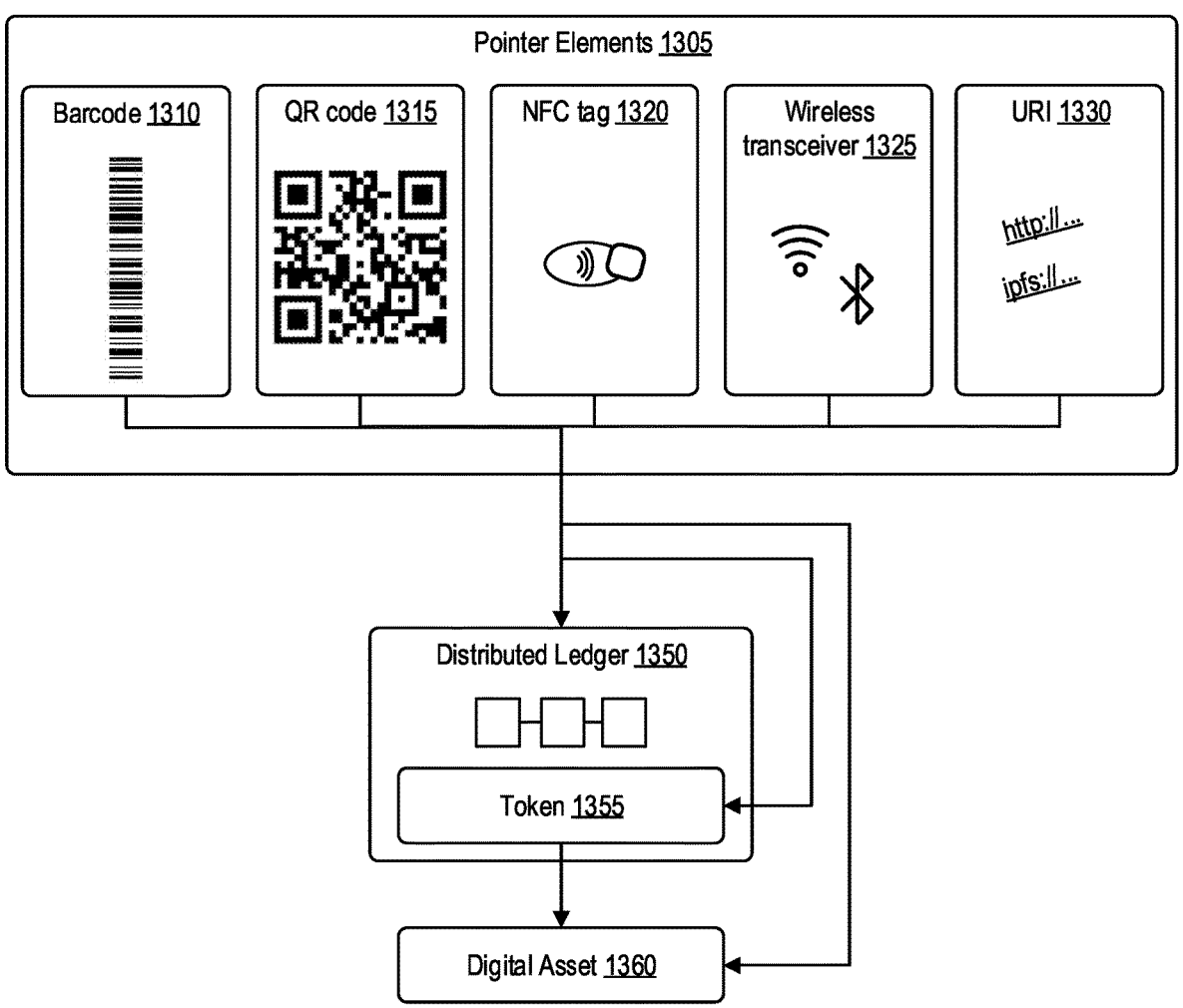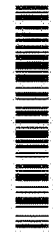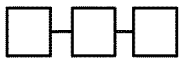
FIG. 13

TRACKING UNIQUE IN-GAME DIGITAL ASSETS USING TOKENS ON A DISTRIBUTED LEDGER

BACKGROUND

1. Technical Field

The present technology pertains to tracking digital assets. More specifically, the present technology may provide various techniques for tracking creation of, use of, modification of, and/or transfer of digital assets that are created within a video game and/or that are created based on gameplay of a video game.

2. Background

Individuals often find it meaningful to own or use unique physical items related to respected celebrities or activities. For example, fans of skilled baseball player Babe Ruth, or of baseball in general, often seek to purchase and own baseballs autographed by Babe Ruth, baseballs hit by Babe Ruth in an important baseball game, trading cards depicting Babe Ruth, and the like.

Video gaming is an increasingly popular activity worldwide. Skilled players of multiplayer video games gain popularity in multiplayer matches or tournaments, which are often live-streamed or otherwise broadcast to numerous viewers. Likewise, well-known players often live-stream or otherwise broadcast gameplay of single-player or multiplayer video games, for instance in which the players perform or attempt speedruns, in-game challenges, multiplayer matches, or other gameplay activities. Some players who are particularly skilled or charismatic can develop large followings of devoted fans, much like fan followings for famous athletes, singers, actors, or other celebrities.

In some video games, a player can use digital assets during gameplay. Such digital assets can include, for example, specific characters, costumes, or items. In traditional video games, multiple instances of the same in-game item exist within the same copy of the video game and/or within different copies of the video game. These different instances of the same in-game item are traditionally fungible, as they are indistinguishable from one another. For instance, even if a particular in-game item is rare to obtain within the video game, the in-game item is represented in the video game as a string of code that is identical to representations of other instances of the same in-game item in the same video game, and/or in other copies of the same video game. Thus, in traditional video games, no one digital asset is unique from other instances of the same in-game item. As a result, in traditional video games, there is no way to know, track, or authenticate a history of a particular instance of an in-game item. For instance, in traditional video games, there is no way to differentiate a specific instance of an in-game item that a famous player of the video game used to win a famous tournament from any other instance of the in-game item.

SUMMARY

Aspects of the present technology include systems and methods for creating, modifying, tracking, authenticating, and/or transferring unique digital assets associated with a video game. The digital assets may be in-game digital assets, such as in-game items or characters. The digital assets may be video game digital media assets with media representations of moments of gameplay of a video game, such as video clips, images, or audio clips. The digital asset is created, and a distributed ledger tracking a history of the digital asset is created and stored across a plurality of devices. A unique token may be created for the digital asset, with a unique identifier for the digital asset and metadata identifying properties of the digital asset. Pending or completed changes to properties of the digital asset, such as ownership, visual appearance, or metadata, can be identified as a request to update the history of the digital asset. A new block can be generated for, and appended to, the distributed ledger identifying the changes to the history of the digital asset. The new block can include one or more hashes of one or more previous blocks in the distributed ledger.

In one example, a system for tracking an in-game digital asset is provided. The system includes a memory and one or more processors (e.g., implemented in circuitry) coupled to the memory. The one or more processors are configured to and can: receive a request to update a history of the in-game digital asset, wherein the in-game digital asset is usable in a video game; identify a distributed ledger that stores a token representing the in-game digital asset, wherein the distributed ledger includes a plurality of blocks that store at least a portion of the history of the in-game digital asset represented as interactions with the token; generate a new block for the distributed ledger automatically in response to receiving the request to update the history of the in-game digital asset, wherein the new block includes a payload identifying one or more updates to the history of the in-game digital asset represented as one or more new interactions with the token, wherein the new block also includes a hash of at least a portion of a prior block of the distributed ledger; and append the new block to the plurality of blocks of the distributed ledger.

In another example, a method for tracking an in-game digital asset is provided. The method includes: receiving a request to update a history of the in-game digital asset, wherein the in-game digital asset is usable in a video game; identifying a distributed ledger that stores a token representing the in-game digital asset, wherein the distributed ledger includes a plurality of blocks that store at least a portion of the history of the in-game digital asset represented as interactions with the token; generating a new block for the distributed ledger automatically in response to receiving the request to update the history of the in-game digital asset, wherein the new block includes a payload identifying one or more updates to the history of the in-game digital asset represented as one or more new interactions with the token, wherein the new block also includes a hash of at least a portion of a prior block of the distributed ledger; and appending the new block to the plurality of blocks of the distributed ledger. In another example, a system for tracking an in-game digital asset is provided, wherein the system includes means for performing each of the operations of the method. In another example, a non-transitory computer-readable medium is provided that has stored thereon instructions that, when executed by one or more processors, cause the one or more processors to perform the method.

In one example, a system for tracking an in-game digital asset is provided. The system includes a memory and one or more processors (e.g., implemented in circuitry) coupled to the memory. The one or more processors are configured to and can: receive a request to update a history of the video game digital media asset, wherein the video game digital media asset includes a media representation of one or more moments of gameplay of a video game; identify a distributed ledger that stores a token representing the video game digital media asset, wherein the distributed ledger includes a plurality of blocks that store at least a portion of the history of the video game digital media asset represented as interactions with the token; generate a new block for the distributed ledger automatically in response to receiving the request to update the history of the video game digital media asset, wherein the new block includes a payload identifying one or more updates to the history of the video game digital media asset represented as one or more new interactions with the token, wherein the new block also includes a hash of at least a portion of a prior block of the distributed ledger; and append the new block to the plurality of blocks of the distributed ledger.

In another example, a method for tracking an in-game digital asset is provided. The method includes: receiving a request to update a history of the video game digital media asset, wherein the video game digital media asset includes a media representation of one or more moments of gameplay of a video game; identifying a distributed ledger that stores a token representing the video game digital media asset, wherein the distributed ledger includes a plurality of blocks that store at least a portion of the history of the video game digital media asset represented as interactions with the token; generating a new block for the distributed ledger automatically in response to receiving the request to update the history of the video game digital media asset, wherein the new block includes a payload identifying one or more updates to the history of the video game digital media asset represented as one or more new interactions with the token, wherein the new block also includes a hash of at least a portion of a prior block of the distributed ledger; and appending the new block to the plurality of blocks of the distributed ledger. In another example, an apparatus for tracking an in-game digital asset is provided, wherein the apparatus includes means for performing each of the operations of the method. In another example, a non-transitory computer-readable medium is provided that has stored thereon instructions that, when executed by one or more processors, cause the one or more processors to perform the method.

BRIEF DESCRIPTION OF THE DRAWINGS

FIG. 6A is a conceptual diagram illustrating an example item customization interface that identifies various instances of an in-game item that each include different customizations, according to an aspect of the present disclosure;

FIG. 6B is a conceptual diagram illustrating an example item history interface that identifies a history of a specific instance of an in-game item, according to an aspect of the present disclosure;

FIG. 8A is a conceptual diagram illustrating an example marketplace interface for transactions of in-game digital assets, according to an aspect of the present disclosure;

FIG. 8B is a conceptual diagram illustrating an example marketplace interface for transactions of video game digital media assets, according to an aspect of the present disclosure;

FIG. 13 is a block diagram illustrating examples of pointer elements that can point users to a digital asset associated with a video game, an associated token, and/or an associated distributed ledger, according to an aspect of the present disclosure;

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Techniques and technologies are described for creating, modifying, tracking, authenticating, and/or transferring unique digital assets associated with a video game. The digital assets may be in-game digital assets, such as in-game items or characters. The digital assets may be video game digital media assets with media representations of moments of gameplay of a video game, such as video clips, images, or audio clips. The digital asset is created, and a distributed ledger tracking a history of the digital asset is created and stored across a plurality of devices. A unique token may be created for the digital asset, with a unique identifier for the digital asset and metadata identifying properties of the digital asset. Pending or completed changes to properties of the digital asset, such as ownership, visual appearance, or metadata, can be identified as a request to update the history of the digital asset. A new block can be generated for, and appended to, the distributed ledger identifying the changes to the history of the digital asset. The new block can include one or more hashes of one or more previous blocks in the distributed ledger.

The techniques and technologies described herein expand the capabilities of digital assets associated with video games, and of systems that create and manage such digital assets, by converting the digital assets associated with video games from being fungible to being non-fungible. The techniques and technologies described herein expand the functionality of digital assets associated with video games, and of systems that create and manage such digital assets, by tracking a history of the digital assets. Tracking the history of the digital assets can include, for example, tracking when, how, and by whom the digital asset was created, used, modified, rented to, rented by, sold to, purchased by, licensed to, licensed by, exchanged to, exchanged by, and/or other actions.

Figure 1:
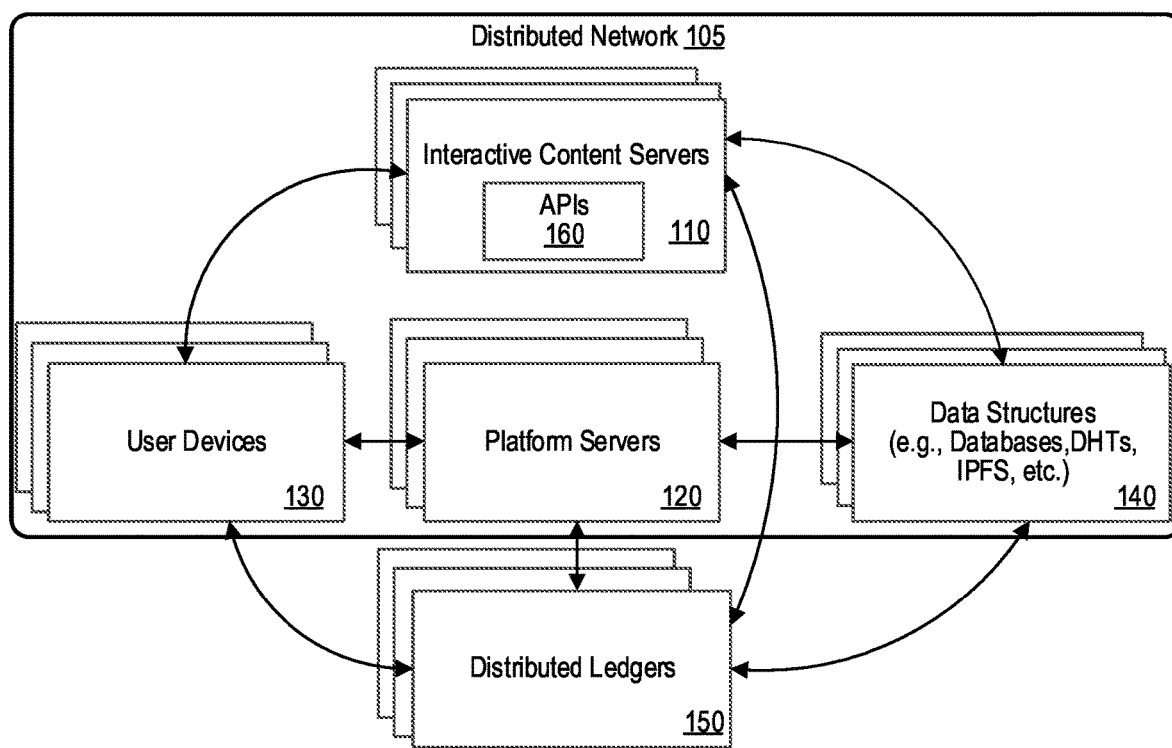
FIG. 1 is a block diagram illustrating an example network environment in which a system for tracking a digital asset associated with a video game using a distributed ledger may be implemented, according to an aspect of the present disclosure.

FIG. 1 illustrates an example network environment 100 in which a system for tracking a digital asset associated with a video game using a distributed ledger may be implemented, according to an aspect of the present disclosure. The network environment 100 may include one or more interactive content servers 110 that provide streaming content (e.g., interactive video, podcasts, video game content, etc.), one or more platform servers 140, one or more user devices 130, one or more data structures 140, one or more distributed ledgers 150. The one or more distributed ledgers 150 can be stored across a distributed network 115, which can include the one or more interactive content servers 110, the one or more platform servers 140, the one or more user devices 130, the one or more data structures 140, or a combination thereof.

Interactive content servers 110 may maintain, stream, and host interactive media available to stream on a user device 130 over a communication network. Such interactive content servers 110 may be implemented in the cloud (e.g., one or more cloud servers). Each media may include one or more sets of object data that may be available for participation with (e.g., viewing or interacting with an activity) by a user. Data about the object shown in the media may be stored by the interactive content servers 110, platform servers 140 and/or the user device 130, in an object file 216 ("object file").

The platform servers 140 may be responsible for communicating with the different interactive content servers 110, data structures 140, and user devices 130. Such platform servers 140 may be implemented on one or more cloud servers. The interactive content servers 110 may communicate with multiple platform servers 140, though the media interactive content servers 110 may be implemented on one or more platform servers 140. The platform servers 140 may also carry out instructions, for example, receiving a user request from a user to stream streaming media (i.e., video games, activities, video, podcasts, User Generated Content ("UGC"), publisher content, etc.). The platform servers 140 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

The streaming media and the associated at least one set of object data may be provided through an application programming interface (API) 160, which allows various types of interactive content servers 110 to communicate with different platform servers 140 and different user devices 130. API 160 may be specific to the particular computer programming language, operating system, protocols, etc., of the interactive content servers 110 providing the streaming media content titles, the platform servers 140 providing the media and the associated at least one set of object data, and user devices 130 receiving the same. In a network environment 100 that includes multiple different types of interactive content servers 110 (or platform servers 140 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An example user device 130 is described in detail herein with respect to FIG. 15.

The data structures 140 can include, for example, one or more databases (DBs), one or more distributed hash tables (DHTs), one or more interplanetary file systems (IPFSs), one or more interplanetary linked data (IPLD) structures, one or more tables, one or more hash tables, one or more heaps, one or more trees, one or more lists, one or more arrays, one or more arraylists, one or more dictionaries, one or more matrices, or a combination thereof. The data structures 140 may be stored on the platform server 140, the interactive content servers 110, any of the servers 218 (shown in FIG.

2A), across one or more different servers, on a single server, across different servers, on any of the user devices 130, within the distributed ledgers 150, on devices identified by network locations identified by pointers (e.g., uniform resource identifiers) stored in the distributed ledgers 150, or a combination thereof. Such data structures 140 may store digital assets associated with video games, such as the streaming media, portions thereof, and/or associated set(s) of object data. Such streaming media may depict one or more objects (e.g., activities) that a user can participate in and/or UGC (e.g., screen shots, videos, commentary, mashups, etc.) created by peers, publishers of the media content titles and/or third party publishers. Portions of the streaming media may include images, video clips, audio clips, or combinations thereof. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the data structures 140. Each user profile may include information about the user (e.g., user progress in an activity and/or media content title, user id, user game characters, etc.) and may be associated to media.

In some examples, an object and/or an object file 216 is an example of a digital asset associated with a video game that is tracked using one or more of the distributed ledgers 150. In some examples, a portion of media, such as a video clip or image or audio clip of one or more moments of gameplay, is an example of a digital asset associated with a video game that is tracked using one or more of the distributed ledgers 150. The portion of media may be generated, recorded, and/or streamed using the interactive content servers 110, platform servers 140, and/or the user device 130.

In some examples, the distributed ledger 150 may be public. In some examples, the distributed ledger 150 may be private. In some examples, the distributed ledger 150 may be partly public and partly private. In some examples, the distributed ledgers 150 can be controlled by, and restricted to, use for a single video game. In some examples, the distributed ledgers 150 can be controlled by, and restricted to, use for a set of video games, such as a particular series of video games. In some examples, the distributed ledgers 150 can be controlled by, and restricted to, use for a single video game console or video game platform. In some examples, the distributed ledgers 150 can be controlled by, and restricted to, use for a set of video game consoles or video game platforms. In some examples, the set of video game consoles or video game platforms can be associated with a single manufacturer, device type, form factor, operating system (OS), or combination thereof. For instance, the distributed ledgers 150 can be controlled by, and restricted to, use for one or more Sony® platforms and/or one or more Sony® PlayStation® platforms corresponding to one or more types of Sony® devices, such as the Sony® PlayStation4®, the Sony® PlayStation5®, the Sony® PlayStation® Vita®, another Sony® PlayStation® portable gaming console, another Sony® PlayStation® home gaming console, a Sony® PlayStationVR® Virtual Reality (VR) system, a Sony® PlayStationTV® home entertainment system, a Sony® tablet, a Sony® mobile handset, or a combination thereof. In some examples, the set of video game consoles or video game platforms can include video game consoles or video game platforms that are associated with more than one manufacturer, device type, form factor, operating system (OS), or combination thereof, for example allowing cross-platform support, cross-device-type support, cross-OS support, or a combination thereof.

Figure 2:
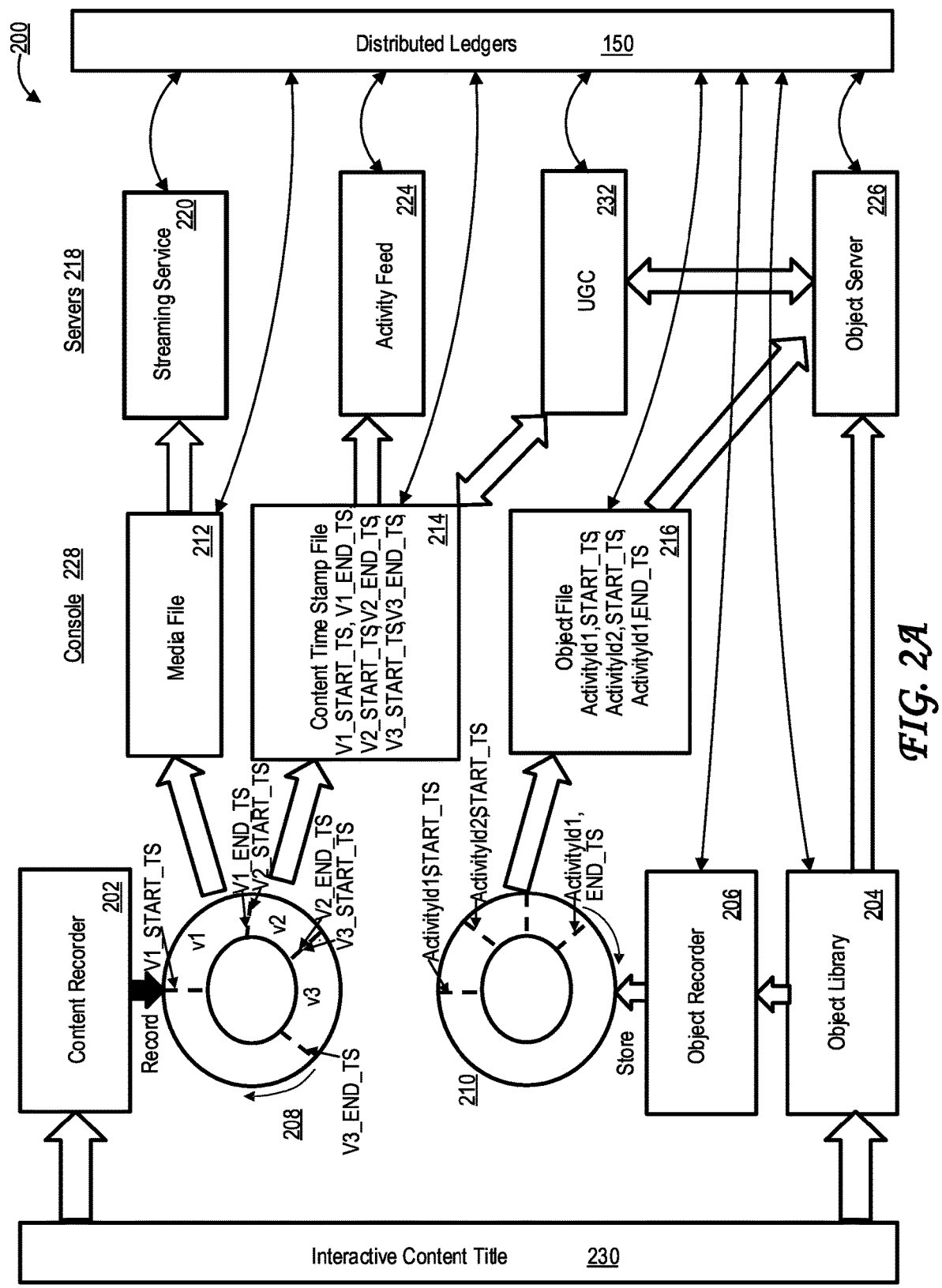
FIG. 2A is a block diagram illustrating an example network environment in which a system for binding object data from a universal data system to media content may be implemented, according to an aspect of the present disclosure.
FIG. 2B is a conceptual diagram illustrating an example table of various objects and associated events, according to an aspect of the present disclosure.

FIG. 2A is a block diagram illustrating an example network environment 200 in which a system for binding object data from a universal data system to media content may be implemented, according to an aspect of the present disclosure. In the example network environment 200 of FIG. 2A, an example console 228 (e.g., a user device 130) and example servers 218 (e.g., streaming server 220, activity feed server 224, UGC server 232, and an object server 226) are shown. The console 228 may be implemented on the platform server 140, a cloud server, or on any of the servers 218. The console 228 may further includes a content recorder 202 and an object recorder 210, described in more detail below, where content (e.g., media) may be recorded and/or output through the console 228. The interactive various content titles 230 may be executed on the console 228. Alternatively or in addition to, the content recorder 202 may be implemented on the platform server 140, a cloud server, or on any of the servers 218. Such content recorder 202 may receive and record content (e.g., media) from an interactive content title 230 (e.g., interactive content source servers 110) onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 (e.g., a portion of the streaming media) may be uploaded to the streaming server 220 for storage and subsequent streaming or use, though the media file 212 may be stored on any server, a cloud server, any console 228, or any user device 130. The media file 212 may be uploaded periodically and/or in real-time or close to real-time. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Figure 4:
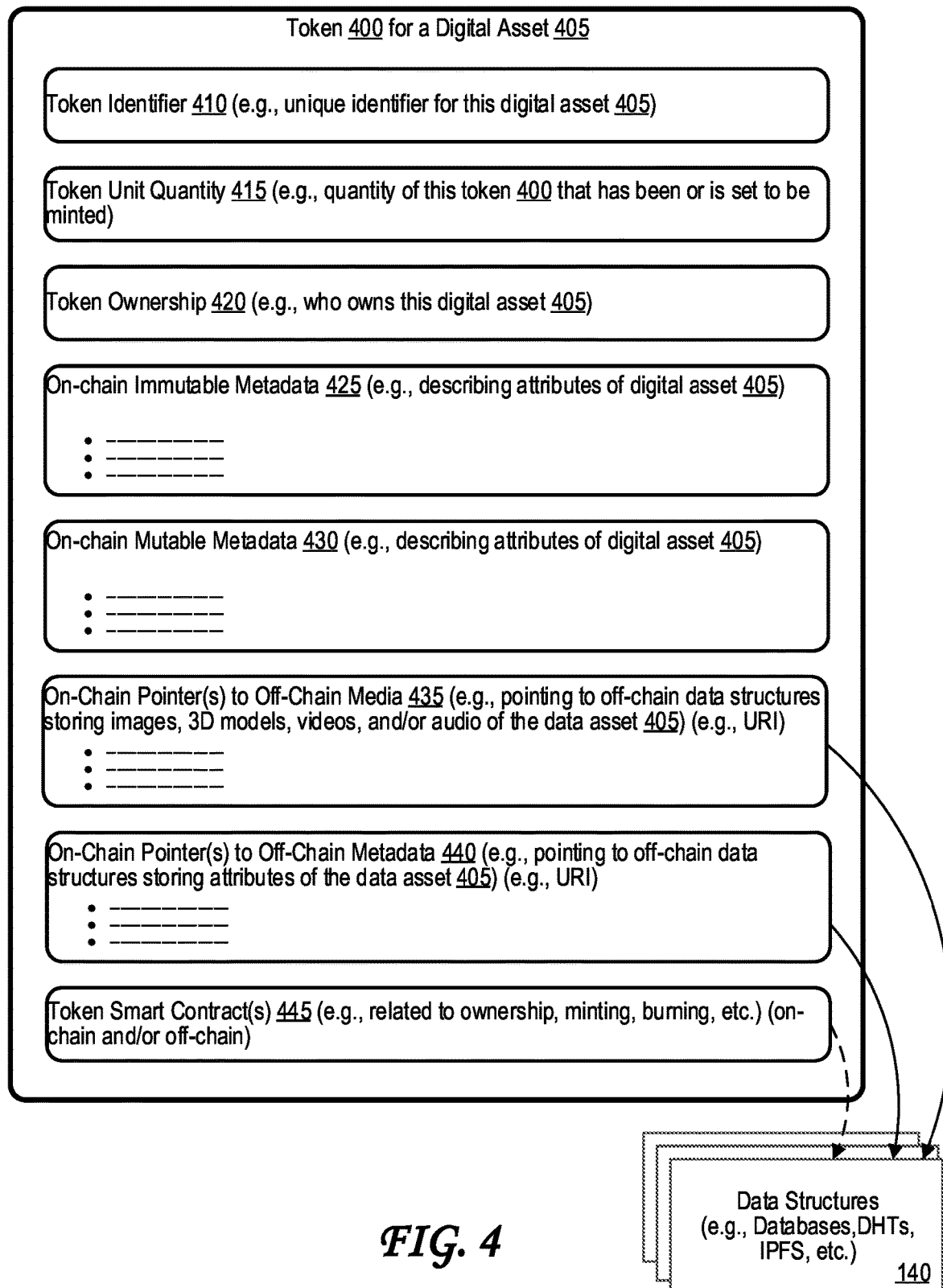
FIG. 4 is a block diagram illustrating an example token that can be non-fungible and that can represent a digital asset associated with a video game as tracked in a distributed ledger, according to an aspect of the present disclosure.

In some examples, the media file 212 may be converted, by the console 228 and/or by the servers 218, into a non-fungible video game digital media asset using a non-fungible token, such as the token 400 of FIG. 4, that is stored in and whose history is tracked across one or more of the distributed ledgers 150. The token corresponding to the media file 212 may include metadata associated with the streaming service 220, the content time stamp file 214, the activity feed 224, the UGC server 232, and/or the object server 226. In some examples, at least some of the actions or activities identified in the activity feed 224 and/or the content time stamp file 214 can be identified in the history of the non-fungible video game digital media asset tracked in the distributed ledgers 150.

Concurrent to the content recorder 202 receiving and recording content from the interactive content title 230, an object library 204 receives object data from the interactive content title 230, and an object recorder 206 tracks the object data to determine when an object beings and ends. Such object data may be uploaded periodically and/or in real-time or close to real-time. The object library 204 and the object recorder 206 may be implemented on the platform server 140, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in an object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the object server 226 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for the object file 216. Such query may be executed by searching for an activity ID of the object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 214, 216.

In some examples, an object identified by the object library 204, by the object recorder 206, by the object ring-buffer 210, by the object file 216, and/or by the object server 226 may be converted, by the console 228 and/or by the servers 218, into a non-fungible in-game digital asset using a non-fungible token, such as the token 400 of FIG. 4, that is stored in and whose history is tracked across one or more of the distributed ledgers 150. The token corresponding to the media file 212 may include metadata associated with the object recorder 206, the object ring-buffer 210, the object file 216, the object server 226, the UGC server 232, the streaming service 220, the content time stamp file 214, and/or the activity feed 224. In some examples, at least some of the actions or activities identified in the activity feed 224, the content time stamp file 214, and/or the object file 216 can be identified in the history of the non-fungible in-game digital asset tracked in the distributed ledgers 150.

FIG. 2B is a conceptual diagram illustrating an example table of various objects and associated events, according to an aspect of the present disclosure. As shown in the example table 250 of FIG. 2B, such object data (e.g., the object file 216) may be associated with event information regarding activity availability change and may be related to other objects with associated object information. Media-object bindings may form telemetry between the objects shown in at least a portion of the streaming media and the streaming media. For example, such object data may be activity data files 251, zone data files 252, actor data files 254, mechanics data files 256, game media data files 258, and other game-play-related data files.

Such activity data files 251 (e.g., the object file 216) may be categorized as in in progress, open-ended, or competitive. Such activity data files 251 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such activity data files 251 may include an activity availability change event for, which may indicate a list or array of currently available activities for the player. For example, this may be used to decide what activities to display in a game plan.

Such zone data files 252 may indicate an area of an associated game world with a single coordinate system wherein the zone may have a 2-D map associated with it, and may be used to display locations on the zone. If zone data files 252 are applicable, each zone may include a zone ID and a short localizable name of the Zone. Such zone data files 252 may be associated with a view projection matrix (4×4) to convert from 3-D world coordinates to a 2-D map position. Such zone data files 252 may be associated with a location change event that indicates an update to a current in-game location of the player. Such location change event may be posted regularly, or whenever the player's in-game location changes significantly. The platform server 140 may store a latest value in 'state.' Such zone data files 252 may include an x, y, z position of the player's character in the zone as well as an a, b, c vector indicating the player's characters orientation or direction. Such zone data files 252 may be associate with an activity start event and/or an activity end event and for the activity end event, an outcome of completed, failed, or abandoned may be associated to the activity (e.g., activity ID).

Such actor data files 254 may be associated with an entity with behaviors in the game, and can be player-controller or game-controlled, and can change dynamically during gameplay. Such actor data files 254 may include an actor ID for the actor, a localizable name for the actor, an image of the actor, and/or a short description of the actor. Such actor data files 254 may be associated with an actor select event that indicates that the player's selected actor(s) have changed. The selected actor(s) may represent the actors the player is controlling in the game and may be displayed on the player's profile and other spaces via the platform server 140. There may be more than one actor selected at time and each game may replace its list of actors upon loading save data.

Such mechanics data files 256 may be associated with an item, skill, or effect that can be used by the player or the game to impact gameplay (e.g., bow, arrow, stealth attack, fire damage) and may exclude items that do no impact gameplay (e.g., collectibles). Such mechanics data files 256 may include a mechanic ID of the mechanic, a short name of the mechanic, an image of the mechanic, and/or a short description of the mechanic. Such mechanics data files 256 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 256 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform server 140. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 256 may be associated with a mechanic use event that indicates that a mechanic has been used by or against the player and may be used to be displayed as mechanic usage in a UGC context. Such mechanics data files 256 may include a list or array of mechanics that were used (e.g, fire arrow, fire damage) or whether an initiator is the player, such that whether the mechanics were used by or against the player. Such mechanics data files 256 may include an initiator actor ID, a current zone ID of the initiator actor, and/or a current x, y, z position of the initiator actor. Such mechanics data files 256 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 256 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 258 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data files 258 may be associated with a game media start event that indicates that a particular piece of game media has started in the game right now and a game media end event that indicates that the particular piece of game media has ended.

In some examples, an object data file 216, an activity data file 251, a zone data file 252, an actor data file 254, a mechanic data file 256, and/or a game media data file 258 may be converted into a non-fungible in-game digital asset using a non-fungible token, such as the token 400 of FIG. 4, that is stored in and whose history is tracked across one or more of the distributed ledgers 150. The token may include metadata associated with the object data file 216, the activity data file 251, the zone data file 252, the actor data file 254, the mechanic data file 256, and/or the game media data file 258. In some examples, at least some of the events identified in the table 250 as associated with at least one of the object data file 216, the activity data file 251, the zone data file 252, the actor data file 254, the mechanic data file 256, and/or the game media data file 258 can be identified in the history of the non-fungible in-game digital asset tracked in the distributed ledgers 150.

Figure 3:
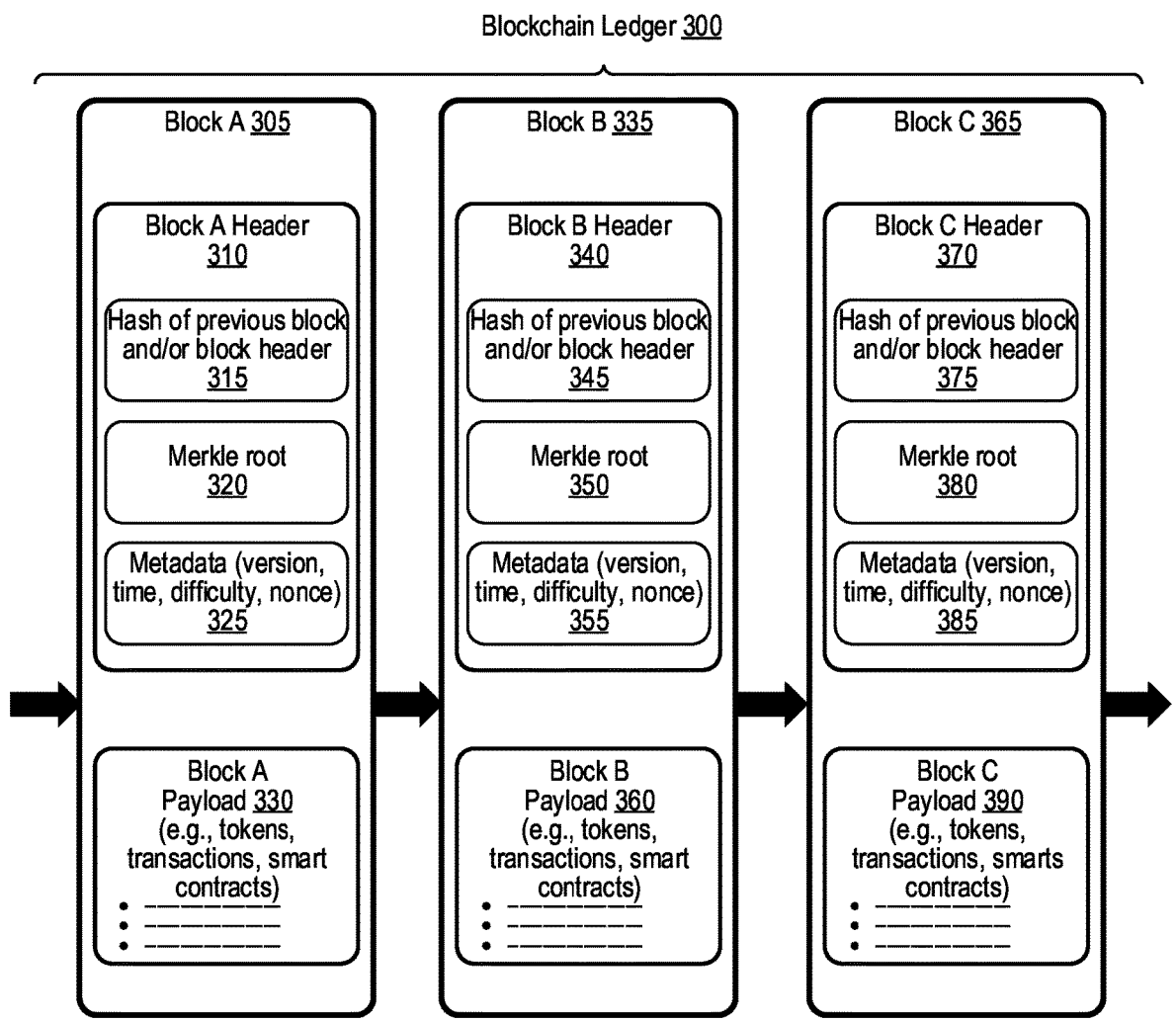
FIG. 3 is a block diagram illustrating three consecutive blocks of a distributed ledger that may be used to track a digital asset associated with a video game, according to an aspect of the present disclosure.

FIG. 3 is a block diagram illustrating three consecutive blocks of a blockchain ledger 300 that may be used to track a digital asset associated with a video game, according to an aspect of the present disclosure. Three blocks of the blockchain ledger 300 are illustrated in FIG. 3, including Block A 305, Block B 335, and Block C 365.

Each block includes a block header 310/340/370 and a list of one or more payloads 330/360/390. In some examples, block header 310/340/370 includes a hash 315/345/375 of the previous block and/or a hash 310/340/370 of the block header of the previous block. For instance, the header 370 of block C 365 includes a hash 375 of the header 340 of block B 335. The header 340 of block B 335 likewise includes a hash 345 of the header 310 of block A 305. The header 310 of block A 305 likewise includes a hash 315 of a header (not pictured) of previous block (not pictured) that is before block A 305 in the blockchain 300. Including the hash of the previous block's header secures the blockchain ledger 300 by preventing modification of any block of the blockchain 300 after the block has been entered into the blockchain 300, as any change to a particular block would cause that block header's hash 315/345/375 in the next block to be incorrect. Further, modification of that block header's hash in the next block would make the next block's header's hash 315/345/375 in the block after the next block incorrect, and so forth. A verifying device can verify that a block has not been modified by computing the hash of block and/or of the block header, then comparing the computed hash to the stored hash 315/345/375 that is stored in the next block. In some distributed ledgers, a block header 310/340/370 can include hashes of multiple previous blocks and/or block headers of multiple previous blocks, as in the distributed acyclic graph (DAG) ledger 1100 of FIG. 11.

Each block's block header 310/340/370 can include a Merkle root 320/350/380. The Merkle root 320/350/380 can be is generated based on hashes of each of the tokens, transactions, smart contracts, and/or other elements identified in the payload 330/360/390 for that block. Any attempt to modify a payload after the block has been entered would change the Merkle root. A verifying device can verify that the payload(s) 330/360/390 have not been modified by computing the Merkle root, then comparing the computed Merkle root to the stored Merkle root 320/350/380 that is stored in the block header 310/340/370. Changes to the payload 330/360/390 and/or to the Merkle root 320/350/380 would also change the hash for the block and/or for the block header, for which a value is stored in the next block as the hash 315/345/375. Each payload of each block may include one or more tokens, one or more transactions, one or more smart contracts, other content, or combinations thereof.

Each block's block header 310/340/370 may also include various elements of metadata, such as a version number for the blockchain ledger platform, a version number for the block itself, a timestamp for verification of each payload, a timestamp for generation of the block, a timestamp for entry of the block into the blockchain ledger 300, a timestamp for request of generation of the block, a difficulty target value (e.g., adjusting difficulty of mining), one or more randomized nonce values, a counter identifying how many nonces have been tried, a title of the blockchain ledger 300, an identifier as to what the blockchain ledger 300 is tracking (e.g., a history of a digital asset associated with a video game), or a combination thereof. Each individual element added can further serve as information that can be verified by a verifying device to identify if the block, and the payload within, is accurate and authorized. The one or more randomized nonce values can serve to further complicate the hashes, improving security.

Each block 305/335/365 of the blockchain 300 also includes a payload 330/360/390. The payload 330/360/390 for each block 305/335/365 can include one or more tokens, one or more transactions, one or more smart contracts, one or more other elements, metadata related to any of the previously-listed elements, or combinations thereof. A token may be, for example, a non-fungible token. The token 400 may be an example of a token that is stored in the payload 330/360/390 for a block 305/335/365. As discussed with respect to the token 400, certain parts of the token 400 are stored within the payload 330/360/390 of the blockchain ledger 300, and are thus stored "on-chain." As discussed with respect to the token 400, certain parts of the token 400 include on-chain pointers that point to data outside of the blockchain ledger 300, such as a data structure 140, with such data being stored "off-chain." The payload 330/360/390 of the blockchain ledger 300 may store hashes of off-chain data, so that a verifying device can compute a hash of the off-chain data and compare the computed hash to the stored hash that is stored on-chain to verify that the off-chain data is accurate. In some examples, the payload 330/360/390 includes one or more smart contracts. The block may include the code of the smart contract stored within the payload 330/360/390 of the blockchain ledger 300, thus storing the code on-chain. If the payload 330/360/390 includes a smart contract, the block may include a hash of the code of the smart contract and/or a pointer to an off-chain data structure 140 storing the code of the smart contract, thus storing the code off-chain. In some examples, some of the smart contract's code may be stored on-chain, while some of the smart contract's code may be stored off-chain. In some examples, smart contracts can be used to create, modify, transfer, or otherwise manage tokens. In some examples, the payload 330/360/390 includes transactions. In some examples, transactions may include transfers of tokens from one account to another account. In some examples, transactions may include changes to certain properties of tokens or the associated digital assets, such as changes to ownership, in-game visual appearance, in-game attributes, authorship, licenses to use, rentals, or combinations thereof.

While FIG. 3 only illustrates three blocks 305/335/365 of the blockchain 300, it should be understood that any blockchain discussed herein may be longer or shorter in that it may have more or fewer than three blocks.

In one illustrative example, a first computing device can store a blockchain ledger including a plurality of blocks. Each of a plurality of computing devices (e.g., in a distributed architecture) also stores a copy of the blockchain ledger. The first computing device can receive a message identifying an intended payload element (e.g., token and/or transaction and/or smart contract). For example, the intended payload element may be a token related to one of the digital assets associated with one or more video games described herein. The first computing device can verify that the intended payload element is valid. In some blockchain ledger 300 implementations, the first computing device can verify that sufficient funds are allocated in order to pay for execution fee charges for the intended payload element, for instance in the form of gas on an Ethereum blockchain ledger. For a transaction, the first computing device can verify whether the transferor has a sufficient quantity of an asset (e.g., whether the transferor owns the token to be transferred) for the transaction to take place. For a smart contract, the first computing device can verify that the smart contract refers to valid accounts that include sufficient quantity of an asset (e.g., token) to execute the smart contract (e.g., to transfer the token), verify that the code of the smart contract can be executed (e.g., does not include syntax errors or other errors), verify that all parties involved in the smart contract have submitted agreement to the terms of the smart contract, or a combination thereof. For a token, the first computing device can verify that the token refers to a valid digital asset, for instance a valid type of digital asset.

The first computing device can generate a hash of a most recent block or block header of the blockchain ledger 300. The first computing device can generate a new block header for a new block. The new block header can include at least the hash of the most recent block or block header of the blockchain ledger 300. The first computing device can generate the new block, the new block including the new block header and a payload with one or more payload elements. The one or more payload elements include at least the intended payload element discussed above (e.g., token, smart contract, transaction). The first computing device can generate a Merkle root based on the payload elements, and include the Merkle root in the new block header. The first computing device can generate a metadata and a nonce value based on the payload elements, and include the metadata and the nonce value in the new block header. The first computing device can append the new block to the plurality of blocks of the blockchain ledger 300 in response to verifying the intended payload element. The first computing device can transmit the new block to the plurality of computing devices that each store the blockchain ledger 300 in response to verifying the intended payload element. Each of the plurality of computing devices also appends the new block to their respective copy of the blockchain ledger 300.

In another illustrative example, a first computing device can store a blockchain ledger 300 including a plurality of blocks. Each of a plurality of computing devices (e.g., in a distributed architecture) also stores a copy of the blockchain ledger 300. The first computing device can receive a UI input identifying an intended payload element (e.g., transaction and/or smart contract). The first computing device can generate a message identifying the intended payload element. The first computing device can retrieve a private key associated with an account corresponding to the first computing device. The first computing device can modify the message by encrypting at least a portion of the message with the private key. The first computing device can transmit the message to the plurality of computing devices other than the first computing device. A second computing device of the plurality of computing devices verifies that the intended payload element is valid, for instance as described in the previous paragraph. The first computing device receives a new block from the second computing device. The new block identifies and/or includes the intended payload element (e.g., in its payload). The first computing device appends the new block to the plurality of blocks of the blockchain ledger 300 at the first computing device.

FIG. 4 is a block diagram illustrating an example token 400 that can be non-fungible and that can represent a digital asset 405 associated with a video game as tracked in a distributed ledger, according to an aspect of the present disclosure. In some examples, the token 400 is a non-fungible token (NFT). In some examples, the token 400 is an ERC721 token, an ERC1155 token, an ERC-20 token, or a combination thereof. In some examples, the token 400 is tracked in a blockchain ledger 300. In some examples, the token 400 is tracked in an Ethereum-based blockchain ledger 300.

The digital asset 405 that the token 400 represents can be an in-game digital asset, such as an in-game item, and in-game character (which can be referred in-game actor), an in-game costume for an in-game character, an in-game area. An in-game digital asset can be referred to as an in-game object, as in the object of FIGS. 2A-2B. An in-game character can be referred to as an in-game actor, as in the actor 254 of FIG. 2B. An in-game area can be referred to as an in-game zone, as in the zone 252 of FIG. 2B. In some examples, the in-game character can be a player character controlled by a player, a non-player character (NPC) that the player cannot control (but in some cases can interact with), or some combination thereof. In some examples, an in-game costume can include in-game representations of clothing, outfits, armor, suits, hats, helmets, tops, shirts, jackets, bottoms, pants, skirts, gloves, gauntlets, shoes, boots, fins, eyewear, headwear, handwear, legwear, footwear, jewelry, accessories, another article of clothing, or combinations thereof. In some examples, in-game items can include ranged weapons, melee weapons, potions, food, consumables, armors, shields, ammunition, magic abilities, health-restorative items, mana-restorative items, vehicles, power-ups, extra lives, extra continues, items that modify the attributes of other items (e.g., upgrading a bow and arrow to shoot fire arrows), or combinations thereof.

The digital assets may be video game digital media assets with media representations of one or more moments of gameplay of a video game, such as video clips, images, or audio clips. For instance, an image may be a representation of a single moment of gameplay of a video game. An image can include, for example, a screenshot. A video clip or audio clip can be a representation of a series of consecutive moments of gameplay of a video game. For instance, each moment of the consecutive moments may be represented by an individual video frame of the video clip, or by a particular set of one or more frequencies and amplitudes of sound in the audio clip. Not all moments must be consecutive, as the video clip or audio clip may cut from one set of moments to another, as in a highlight reel. In some examples, an image can be a representation of multiple moments of gameplay of a video game, for example as in a collage of images or a long-exposure-style image that includes a representation of a path along which one or more characters or items moved over one or more durations of time. An image, video clip, and/or audio clip can be captured from a view, perspective, and/or vantage point that a particular player has during gameplay. An image, video clip, and/or audio clip can be captured from a different view, perspective, and/or vantage point than any individual player has.

In some examples, the digital asset can include a save file that saves progress in a video game at a particular point in the progression (e.g., in the story) of the video game. The save file can be identified as an in-game digital asset, since it is usable in-game. The save file can be identified as a video game digital media asset, since it functions as a representation of a moment of gameplay at which the save file was saved.

In some examples, the digital asset can include a "ghost" that can be imported into a game in a way that is visible to a player of the game. The ghost can follow a path of a previous player's gameplay. For example, in a racing game, a ghost can show us in a player's game following the route that another player raced at the pace that that player raced. The ghost can be identified as an in-game digital asset, since it is usable in-game. The ghost can be identified as a video game digital media asset, since it functions as a representation of multiple moments (a duration of time) of the previous player's gameplay.

One or more token smart contracts 445 can be associated with the token 400. For instance, the one or more token smart contracts 445 manage creation (or "minting") of the token 400. The one or more token smart contracts 445 can pay miner devices that create ("mint") a token 400, or batches of tokens, for computing time and resources taken to mint the token 400. The one or more token smart contracts 445 can control how ownership of the token 400 is decided and/or transferred. For instance, the one or more token smart contracts 445 can indicate an initial owner of the token 400 and/or can identify conditions under which ownership automatically transfers, for instance an offer meeting or exceeding an owner-mutable threshold amount. The one or more token smart contracts 445 can indicate conditions under which the token 400 can be rented out or licensed out for use by licensee users/players, for instance an offer meeting or exceeding an owner-mutable threshold amount. The one or more token smart contracts 445 can control conditions under which the token 400 can be burnt, or irreversibly destroyed and/or unlisted. The elements identified as part of the token 400 in FIG. 4—including the token identifier 410, the token unit quantity 415, the token ownership 420, the on-chain immutable metadata 425, the on-chain mutable metadata 430, the on-chain pointers to off-chain media 435, the on-chain pointers to off-chain metadata 440—can be stored as part of the token 400, can be part of the token smart contracts 445, or both. In some examples, the code of the token smart contracts 440 is stored at least partly on-chain. In some examples, the code of the token smart contracts 440 is stored at least partly off-chain at off-chain location(s) such as the data structures 140, with the off-chain location(s) identified by on-chain pointers to the off-chain location(s).

The token 400 includes a token identifier 410, which may be referred to as a tokenID. The token identifier 410 can be a unique identifier for the token 400 and/or for the digital asset 405. The token identifier 410 can be used to distinguish the particular instance of the digital asset 405 that the token 400 corresponds to from any other instance of the digital asset 405. In some examples, token identifiers can be created by a computing system creating (or "minting") the token 400 by incremented sequentially compared to token identifiers of previously-created tokens, to ensure that each token identifier is unique.

The token 400 can include a token unit quantity 415. The token unit quantity 415 can identify a quantity of the token 400 that has been or is set to be minted. In some examples, the token unit quantity 415 is one, in which case a single token 400 exists for a given digital asset 405. In some examples the token unit quantity 415 is greater than one. For example, if the token unit quantity 415 is 5, then there are effectively 5 copies of this token 400 representing this unique digital asset 405 that can be owned and/or transferred separately. Those 5 copies may be fungible between one another, or indistinguishable from one another. However, those 5 copies are still non-fungible, unique, distinct, and/or distinguishable relative to any other instance or version or variant of the digital asset 405. The token unit quantity 415 can control how rare the token 400, and by extension the digital asset 405, is. If the token unit quantity 415 is one, then the token 400 and corresponding digital asset 405 is unique. If the token unit quantity 415 is more than one but less than a rarity threshold, then the token 400 and corresponding digital asset 405 is rare. If the token unit quantity 415 is more than one but more than a rarity threshold, then the token 400 and corresponding digital asset 405 is common. In some examples, there may be any number of ranges of rarity, in addition to or instead of unique, rare, and common—such as legendary, very rare, slightly rare, uncommon, and other categories of rarity. In some cases, the token unit quantity 415 can be decided as part of the minting process and/or identified in one of the token smart contracts 445 that manages the minting process.

The token 400 may identify a token ownership 420, which may identify who owns the token 400, and by extension, the corresponding digital asset 405. The token ownership 420 may initially be assigned to a creator of the digital asset 405. The token smart contracts 445 can control rules for transfer of token ownership 420. Token ownership 420 can be transferred as a transaction that is recorded as a payload element in a payload of a block of a blockchain ledger or other distributed ledger.

The token 400 may include on-chain immutable metadata 425. The on-chain immutable metadata 425 can include, for example, a description of the token 400, a description of the digital asset 405 that the token 400 represents, some immutable attributes or properties of the digital asset 405 and/or the token 400, or some combination thereof. The on-chain immutable metadata 425 can use properties of the distributed ledger and/or of the token smart contracts 445 to ensure that the on-chain immutable metadata 425 remains unchanged. In some examples, the on-chain immutable metadata 425 can identify which game the data asset 405 is from, is a representation (e.g., recording) of, or is otherwise related to. In some examples, the on-chain immutable metadata 425 can identify a creator of the digital asset 405 and/or of the token 400. In some examples, the on-chain immutable metadata 425 can identify statistics for the digital asset 405 and/or of the token 400 (e.g., this in-game item provides +2 attack power).

The token 400 may include on-chain mutable metadata 430. The on-chain mutable metadata 430 can include, for example, a description of the token 400, a description of the digital asset 405 that the token 400 represents, some immutable attributes or properties of the digital asset 405 and/or the token 400, or some combination thereof. The on-chain mutable metadata 430 can be mutable or changeable. In some examples, a change to the on-chain mutable metadata 430 can be recorded as a transaction that is recorded as a payload element in a payload of a block of a blockchain ledger or other distributed ledger. In some examples, the on-chain immutable metadata 425 can identify how many times the digital asset 405 has been used in-game and/or how many different players have used the digital asset 405.

The token 400 may include on-chain pointers to off-chain media 435. The off-chain media can include the digital asset 405 and/or one or more representations of the digital asset 405. For example, the off-chain media can include one or more images, 3D models, video clips, audio clips, or combinations thereof. These types of media can require a lot of storage space to store, and can thus be expensive to store on-chain in terms of execution fee charges (such as gas on an Ethereum blockchain ledger). Thus, it may be more efficient to store this media off-chain in one or more off-chain locations, such as the data structures 140. The on-chain pointer can include a uniform resource identifier (URI), such as a uniform resource locator (URL), that points to the one or more network locations of the one or more off-chain locations. In some examples, hashes can be stored of the off-chain media, so that a verifying device can compute a hash of the off-chain media and compare the computed hash to the stored hash that is stored on-chain to verify that the off-chain media is accurate. In some examples, the off-chain media may be immutable. In some examples, the off-chain media may be mutable. In some examples, the pointer may be immutable. In some examples, the pointer may be mutable.

The token 400 may include on-chain pointers to off-chain metadata 440. The off-chain metadata 430 can include, for example, a description of the token 400, a description of the digital asset 405 that the token 400 represents, some immutable attributes or properties of the digital asset 405 and/or the token 400, or some combination thereof. Some digital assets 405 and/or tokens 400 may require significant quantities of metadata, which can require a lot of storage space to store, and can thus be expensive to store on-chain in terms of execution fee charges (such as gas on an Ethereum blockchain ledger). Thus, it may be more efficient to store this metadata off-chain in one or more off-chain locations, such as the data structures 140. The on-chain pointer can include a uniform resource identifier (URI), such as a uniform resource locator (URL), that points to the one or more network locations of the one or more off-chain locations. In some examples, hashes can be stored of the off-chain metadata, so that a verifying device can compute a hash of the off-chain metadata and compare the computed hash to the stored hash that is stored on-chain to verify that the off-chain metadata is accurate. In some examples, the off-chain metadata may be immutable. In some examples, the off-chain metadata may be mutable. In some examples, the pointer may be immutable. In some examples, the pointer may be mutable.

Figure 5A:
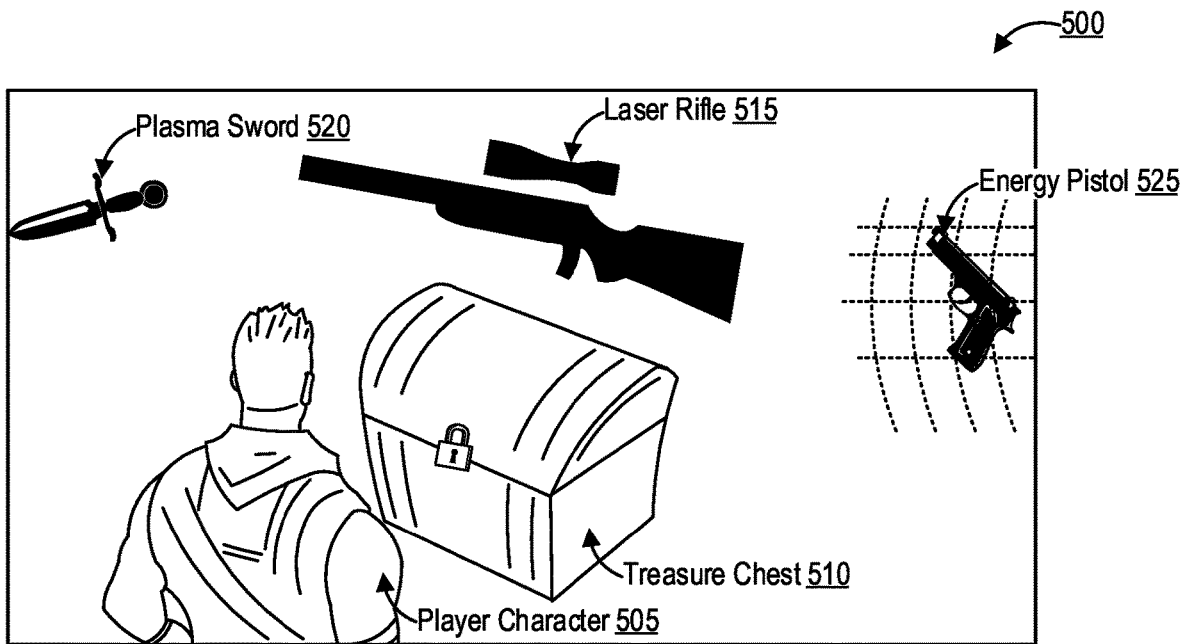
FIG. 5A is a conceptual diagram illustrating an example video game interface in which a player character is in an environment with several in-game items, according to an aspect of the present disclosure.

FIG. 5A is a conceptual diagram illustrating an example video game interface 500 in which a player character is in an environment with several in-game items, according to an aspect of the present disclosure. The video game interface 500 may be a gameplay interface for a player playing the video game. The video game interface 500 may be a viewer interface of a viewer streaming or otherwise viewing a player's gameplay of the video game, either live (as in a livestream) or some time after the gameplay. The video game interface 500 shows a player character 505, which may be an example of an in-game character that is controlled by a player of the video game, approaching a treasure chest 510, which may be an example of an in-game item. The video game interface 500 shows two other in-game items—a laser rifle 515 and a plasma sword 520—that have come out of the treasure chest 510 in response to the player character 505 opening the treasure chest 510. The video game interface 500 shows an energy pistol 525 icon overlaid over a grid that indicates that the energy pistol 525 is an in-game item that the player character 505 currently has equipped.

Figure 5B:
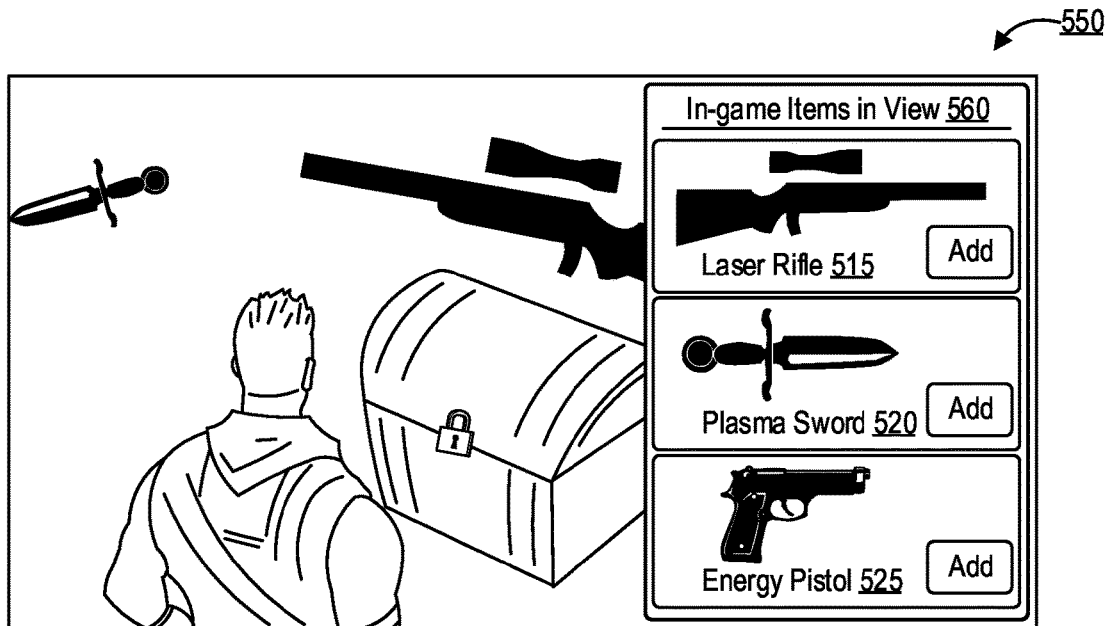
FIG. 5B is a conceptual diagram illustrating an example video game interface that highlights the in-game items in view in the video game interface of FIG. 5A, according to an aspect of the present disclosure.

FIG. 5B is a conceptual diagram illustrating an example video game interface 550 that highlights the in-game items in view in the video game interface of FIG. 5A, according to an aspect of the present disclosure. As with the video game interface 500, the video game interface 550 may be gameplay interface for a player playing the video game or a viewer interface of a viewer streaming or otherwise viewing a player's gameplay of the video game. The video game interface 500 includes an "in-game items in view 560" interface, which lists in-game items visible in the view of the video game interface 500 and/or video game interface 550, including the laser rifle 515, the plasma sword 520, and the energy pistol 525. Each listed in-game item can be added to the "in-game items in view 560" interface by a console 228 or server server 218 that generates the "in-game items in view 560" interface based on identification of identifiable tokens 400 corresponding to each of the in-game items. Each listed in-game item includes an "add" button, allowing the player and/or a viewer accessing the "in-game items in view 560" interface of the video game interface 550 to add one or more of the in-game items, and/or an associated token 400, to their inventory. In some examples, the treasure chest 510 may also be identified in the "in-game items in view 560" interface. In some examples, the treasure chest 510 may be missing from the "in-game items in view 560" interface because of a certain property indicating that it cannot be obtained, or because no token 400 was created for the treasure chest 510.

FIG. 6A is a conceptual diagram illustrating an example item customization interface 600 that identifies various instances of an in-game item that each include different customizations, according to an aspect of the present disclosure. The item customization interface 600 identifies various instances of the laser rifle 515, each of which may be unique, non-fungible, and/or correspond to its own token 400. For example, the item customization interface 600 includes a "customize 610" tab that lists customized variants of the laser rifle 515, each of which may be unique, non-fungible, and/or correspond to its own token 400. The customized variants of the laser rifle 515 include a no-scope laser rifle 620 without a scope and with a chevron visual design that was created by a user "Bob2000," a silenced laser rifle 625 with a silencer and with a skull-and-crossbones and striped visual design that was created by a user "Snipe123," and a sawn-off laser rifle 630 with a stubby sawn-off end and with a rocket-adorned visual design that was created by a user "TopDog85." The item customization interface 600 includes a "mods 615" tab that may list types of modifications that can be performed on the laser rifle 515, such as the addition or removal of the scope, the addition or removal of the silencer, the short sawn-off end or long barrel, and/or other possible modifications to other properties of the laser rifle 515.

FIG. 6B is a conceptual diagram illustrating an example item history interface 650 that identifies a history of a specific instance of an in-game item, according to an aspect of the present disclosure. The item history interface 650 of FIG. 6B highlights a specific digital asset identified in FIG. 6A—the silenced laser rifle 625. The item history interface 650 includes a "history 660" tab under which the history of the digital asset (the silenced laser rifle 625) is listed, as tracked by an associated token 400 and an associated distributed ledger. The history 660 identifies that the silenced laser rifle 625 digital asset was created by user "Snipe123" on Apr. 18, 2021 at 11:22:39 AM. The history 660 identifies that user "Snipe123" shot user "Steve99" using the silenced laser rifle 625 digital asset during Match_402812 on Apr. 19, 2021 at 3:42:56 PM. The history 660 identifies that user "Snipe123" customized the artistic style of the silenced laser rifle 625 digital asset, for example to add the skull and crossbones visual icons, on Apr. 21, 2021 at 1:29:12 PM. The history 660 identifies that the silenced laser rifle 625 digital asset (and the associated token 400) was transferred from user "Snipe123" to user "TopDog85," for instance because user "TopDog85" purchased the silenced laser rifle 625 digital asset (and the associated token 400) from user "Snipe123," on Apr. 21, 2021 at 3:10:44 PM. The history 660 identifies that user "TopDog85" shot user "Bob2000" using the silenced laser rifle 625 digital asset during Match_402839 on Apr. 22, 2021 at 7:05:32 PM. The example item history interface 650 also includes a "owners" tab 665, which may for example identify that that the silenced laser rifle 625 digital asset (and associated token 400) was originally owned by the user "Snipe123" and is now owned by the user "TopDog85" following the transfer of ownership on Apr. 21, 2021 at 3:10:44 PM.

Each entry in the history 660 includes a media button (with a right-facing arrow), which, if pressed, may trigger playback of a video clip, audio clip, and/or image of the activity, action, or transaction to which it corresponds. An example of a video clip is identified as video game digital media asset 690, which depicts user "Snipe123" shooting user "Steve99" using the silenced laser rifle 625 digital asset during Match_402812 on Apr. 19, 2021 at 3:42:56 PM.

The item history interface 650 also includes a buy button 670, allowing a viewer of the item history interface 650 to buy the silenced laser rifle 625 digital asset (buy purchasing the corresponding token 400). The item history interface 650 also includes a license button 675, allowing a viewer of the item history interface 650 to license use the silenced laser rifle 625 digital asset (buy licensing the corresponding token 400) to become a licensee. Licensing can include rental, and in some cases an owner may license use of a digital asset for certain restricted uses via token smart contracts 445 as a licensor without actually transferring ownership of the digital asset and/or token 400. The item history interface 650 also includes a message button 680, allowing a viewer of the item history interface 650 to message the owner and/or the creator of the silenced laser rifle 625 digital asset.

Figure 7A:
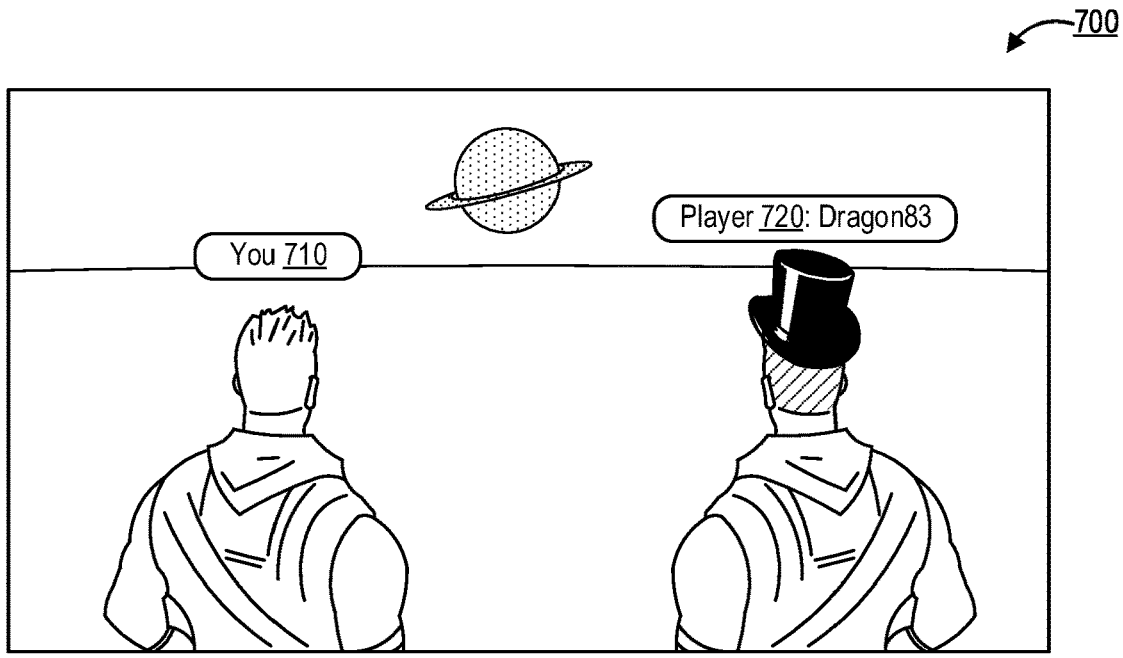
FIG. 7A is a conceptual diagram illustrating an example video game interface in which a first player character corresponding to a first user encounters a second player character corresponding to a second user, according to an aspect of the present disclosure.

FIG. 7A is a conceptual diagram illustrating an example video game interface 700 in which a first player character 710 corresponding to a first user encounters a second player character 720 corresponding to a second user, according to an aspect of the present disclosure. The first player character 710 is labeled "You" to indicate that the first player character 710 corresponds to the player playing the video game using the video game interface 700. The second player character 720 is labeled "Dragon83," which may be a username or other user identifier of the second user.

Figure 7B:
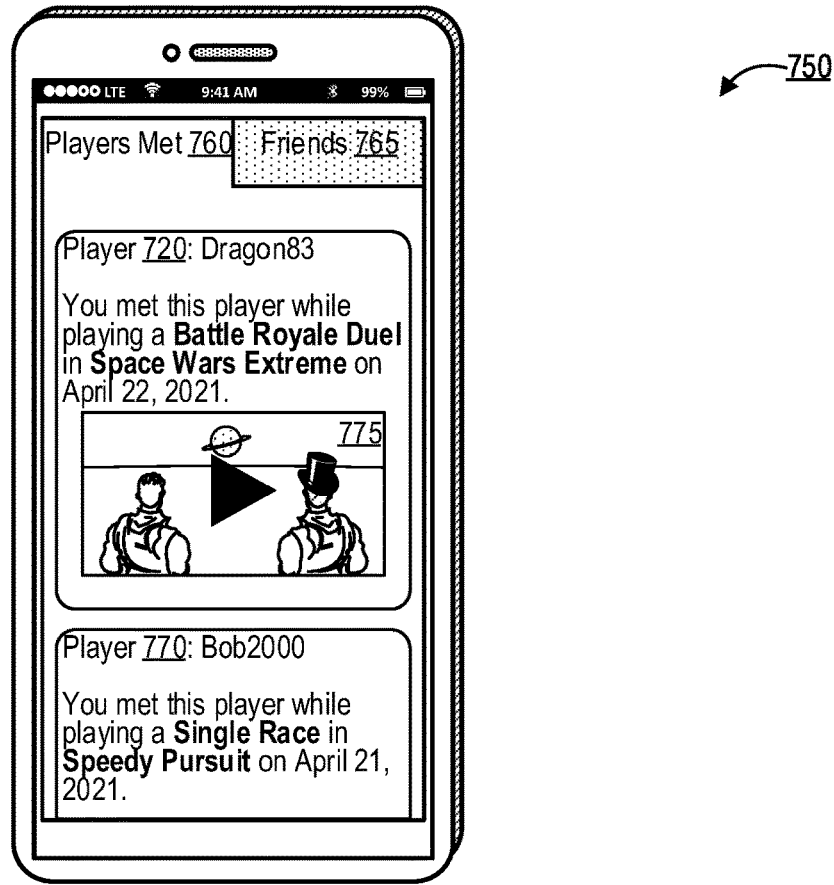
FIG. 7B is a conceptual diagram illustrating an example player list interface identifying users whose corresponding player characters have been encountered by a first player character corresponding to a first user, according to an aspect of the present disclosure.

FIG. 7B is a conceptual diagram illustrating an example player list interface 750 identifying users whose corresponding player characters have been encountered by a first player character 710 corresponding to a first user, according to an aspect of the present disclosure. The player list interface 750 includes a "players met" tab 760, which identifies the second player character 720 corresponding to the second user Dragon83, stating "You met this player while playing a Battle Royale Duel in Space Wars Extreme on Apr. 22, 2021." A video clip 775 or other video game digital media asset is included depicting one or more moments in which the first player character 710 corresponding to the first user encounters the second player character 720 corresponding to the second user Dragon83. The "players met" tab 760 also identifies that the first player character 710 corresponding to the first user encountered another player character 770 corresponding to a third user, Bob 2000, stating "You met this player while playing a Single Race in Speedy Pursuit on Apr. 21, 2021."

The player list interface 750 also includes a "friends" tab 765. In some examples, the first user may follow or befriend other users whose player characters the first user encountered through the first user's player character(s) in one or more video games, for example as identified in the players met tab 760. In some examples, each user may be assigned a token 400, which may be used to track the history of that user (similarly to the item history interface 650 of FIG. 6B but for the actions and transactions of that user). In some examples, each player character may be assigned a token 400, which may be used to track the history of that player character (similarly to the item history interface 650 of FIG. 6B but for the actions and transactions of that player character).

In some examples, the player list interface 750, or a similar interface, can be used by a user to track news related to certain users, player characters, in-game items, or other digital assets based on the tokens 400 and/or digital ledgers associated with those digital assets. For example, such as news interface can keep a viewer of the news interface apprised every time a particular user is playing a video game, every time a particular player character is used in a match (or is used in a specific way), every time a particular in-game item is used in a match (or is used to perform a specific type of action), or some combination thereof.

FIG. 8A is a conceptual diagram 800 illustrating an example marketplace interface 805 for transactions of in-game digital assets 810, according to an aspect of the present disclosure. The marketplace interface 805 can be an interface within a video game or outside of the video game, for example on a website accessed by a browser running on a console or mobile device, a software application running on a console or mobile device, or a combination thereof. The marketplace interface 800 for transactions of in-game digital assets facilitates transactions of in-game digital assets, such as in-game items 815, in-game costumes 820, in-game areas 825, in-game characters, save files, ghosts, other types of in-game digital assets, or combinations thereof.

The in-game items 815 include the no-scope laser rifle 620, created by user Bob2000. The statistics for the no-scope laser rifle 620 identify that it is for/from the video game "Space Wars" and provides –2 accuracy and +1 damage. The unit quantity is 5 (indicating 5 tokens 400), the purchase price is $25, and the rental price is $5 per day. The in-game items 815 include the silenced laser rifle 625, created by user Snipe124. The statistics for the silenced laser rifle 625 identify that it is for/from the video game "Space Wars" and provides +1 stealth. The unit quantity is 1 (indicating 1 token 400), the purchase price is $70, and the rental price is $9 per day. The in-game items 815 include the sawn-off laser rifle 630, created by user TopDog85. The statistics for the sawn-off laser rifle 630 identify that it is for/from the video game "Space Wars" and provides –3 accuracy and +4 damage. The unit quantity is 2 (indicating 2 tokens 400), the purchase price is $35, and the rental price is $7 per day. The in-game items 815 include the Spicy Herb, created by user TopDog85. The statistics for the Spicy Herb identify that it is for/from the video game "ActionTime" and provides +2 health and +1 damage. The unit quantity is 23 (indicating 23 tokens 400), the purchase price is $8, and the rental price is $1 per day.

The in-game costumes 820 include the top hat, created by user Bob2000. The statistics for the top hat identify that it is for/from the video game "Space Wars" and provides +1 charisma. The unit quantity is 1 (indicating 1 token 400), the purchase price is $17, and the rental price is $3 per day. The in-game costumes 820 include the explorer outfit, created by user Snipe123. The statistics for the explorer outfit identify that it is for/from the video game "Space Wars" and provides +2 defense. The unit quantity is 80 (indicating 80 tokens 400), the purchase price is $5, and the rental price is $1 per day.

The in-game areas 825 include the Factory, created by user Ashley33. The statistics for the factory identify that it is for/from the video game "Space Wars" and functions as a duel arena. The unit quantity is 30 (indicating 30 tokens 400), the purchase price is $17, and the rental price is $3 per day. The in-game areas 25 include Future Earth, created by user Ashley33. The statistics for the Future Earth identify that it is for/from the video game "ActionTime" and functions as a single-player level set (a set of single-player levels). The unit quantity is 50 (indicating 50 tokens 400), the purchase price is $15, and the rental price is $2 per day.

FIG. 8B is a conceptual diagram illustrating an example marketplace interface 850 for transactions of video game digital media assets 860, according to an aspect of the present disclosure. The marketplace interface 855 can be an interface within a video game or outside of the video game, for example on a website accessed by a browser running on a console or mobile device, a software application running on a console or mobile device, or a combination thereof. The marketplace interface 850 for transactions of video game digital media assets 860 facilitates transactions of video game digital media assets 860, such as video clips 865, images 870, audio clips 875, save files, ghosts, other types of video game digital media assets, or combinations thereof.

The video clips 865 include a first video clip titled "The shot that won the game!" created by user Snipe123 and depicting a player character shooting another player character to win a game. The statistics for the first video clip indicate that it is from the video game "Space Wars," is 15 seconds long, and is provided at 1080 p resolution. The unit quantity is 5 (indicating 5 tokens 400), the purchase price is $25, and the rental price is $5 per day. The video clips 865 include a second video clip titled "Snipe123 customizes Laser Rifle" created by user Snipe 143 and depicting creation and/or customization of a laser rifle in-game item. The statistics for the second video clip indicate that it is from the video game "Space Wars," is 56 seconds long, and is provided at 720 p resolution. The unit quantity is 1 (indicating 1 token 400), the purchase price is $70, and the rental price is $9 per day. The video clips 865 include a third video clip titled "20 headshots in a row!" created by user TopDog85 and depicting a player character obtaining 20 headshots in a row. The statistics for the third video clip indicate that it is from the video game "ActionTime," is 1:26 in length, and is provided at 1080 p resolution. The unit quantity is 2 (indicating 2 tokens 400), the purchase price is $35, and the rental price is $7 per day. The video clips 865 include a fourth video clip titled "World record speedrun" created by user TopDog85 and depicting a speedrun. The statistics for the fourth video clip indicate that it is from the video game "RunJump," is 4:36 in duration, and is provided at 720 p resolution. The unit quantity is 23 (indicating 23 tokens 400), the purchase price is $8, and the rental price is $1 per day.

The images 870 include a first image titled "Weird glitch: duplicating character!" created by user Bob200 and depicting a glitch in which a player character is duplicated. The statistics for the first image indicate that it is from the video game "Space Wars," and is provided at 1080 p resolution in JPG format. The unit quantity is 1 (indicating 1 token 400), the purchase price is $17, and the rental price is $3 per day. The images 870 include a second image titled "Optimal Route for Speedrunning!" created by user Snipe123 and depicting a route for speedrunning a game. The statistics for the second image indicate that it is from the video game "RunJump," and is provided at 1080 p resolution in PNG format. The unit quantity is 80 (indicating 80 tokens 400), the purchase price is $5, and the rental price is $1 per day.

The audio clips 875 include a first audio clip titled "Blue Team's Catchphrase" created by user Sam44. The statistics for the first audio clip indicate that it is from the video game "Space Wars," is 14 seconds long, and is provided at 90 kbps audio quality. The unit quantity is 300 (indicating 300 tokens

400), the purchase price is $3, and the rental price is $1 per day. The audio clips 875 include a second audio clip titled "Audience Cheering at Match 3" created by user Ashley33. The statistics for the second audio clip indicate that it is from the video game "RunJump," is 32 seconds long, and is provided at 320 kpbs audio quality. The unit quantity is 90 (indicating 90 tokens 400), the purchase price is $16, and the rental price is $3 per day.

Figure 12:
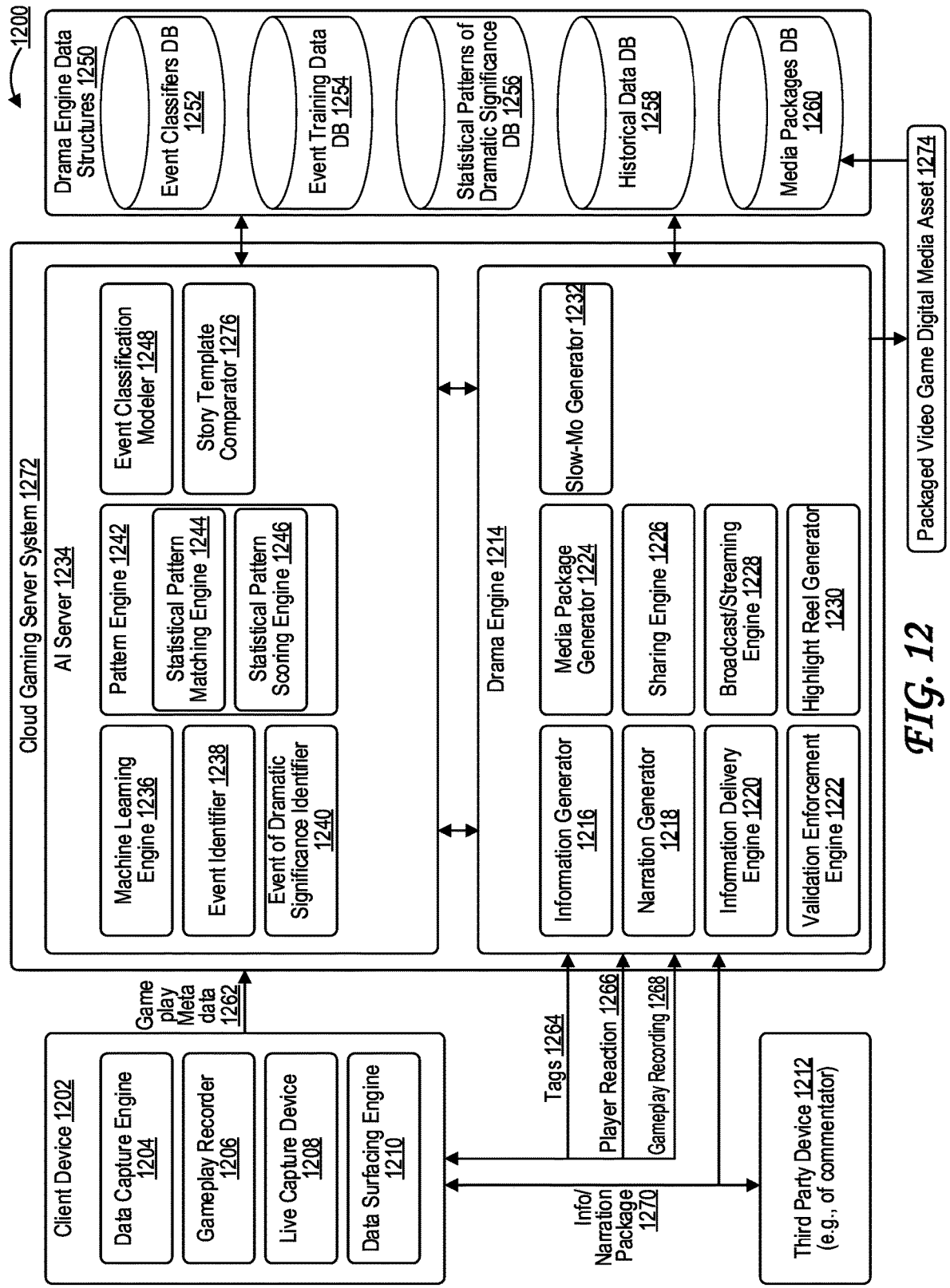
FIG. 12 is a block diagram illustrating an example network environment in which a video game digital media significance engine may be implemented, according to an aspect of the present disclosure.

In some examples, the video game digital media assets 860 may be manually selected and/or created by users. In some examples, a video game digital media significance engine (which may be part of the interactive content servers 110 and/or the platform servers 140 and/or the console 228 and/or the servers 218) can automatically identify actions, sets of actions, moments, or sets of moments of significance, and automatically creates the video game digital media assets 860 in response to detecting significance. Examples of the video game digital media significance engine are illustrated in FIG. 12 and may include, for example, the drama engine 1214, the AI server 1234, the cloud gaming server 1272, the drama engine data structures 1250, or a combination thereof. The video game digital media significance engine can identify significance based on, for instance, the first time a particular action has been performed (by a player, regionally, and/or worldwide), a (personal, regional, and/or world) record for performing a particular action or set of actions in the game (in record time and/or with a record score), an in-game action that received a particularly strong (loud and/or heavy in movement exceeding a threshold) positive or negative reaction (from the player, an opponent, and/or an audience), an in-game action associated with a number that met or exceeded a threshold, an in-game action associated with a number that met or is less than a threshold, other significant accomplishments, or combinations thereof. Examples of the video game digital media asset may include the packaged video game digital media asset 1274 generated by the drama engine 1214 and/or the AI server 1234 of FIG. 12, The video game digital media significance engine can identify as significant actions, for example, the first time anyone has ever killed 20 enemies in a row with headshots, the most consecutive headshots anyone has ever gotten, the fastest time for any player to get 20 headshots in a game, the most total headshots of any player in history, the most consecutive headshots without incurring any damage from enemies, a player encountering a glitch in the game, or a combination thereof. In some examples, the video game digital media significance engine can notify a user when the video game digital media significance engine has identified an action that is significant and has generated a video game digital media asset 860 based on the significant action.

In some examples, the marketplace interfaces 805 and 855 may be public. In some examples, the marketplace interfaces 805 and 855 may be private. In some examples, the marketplace interfaces 805 and 855 may be partly public and partly private. In some examples, the marketplace interfaces 805 and 855 can be controlled by, and restricted to, use for a single video game. In some examples, the marketplace interfaces 805 and 855 can be controlled by, and restricted to, use for a set of video games, such as a particular series of video games. In some examples, the marketplace interfaces 805 and 855 can be controlled by, and restricted to, use for a single video game console or video game platform. In some examples, the marketplace interfaces 805 and 855 can be controlled by, and restricted to, use for a set of video game consoles or video game platforms. In some examples, the set of video game consoles or video game platforms can be associated with a single manufacturer, device type, form factor, operating system (OS), or combination thereof. In some examples, the marketplace interfaces 805 and 855 can be controlled by, and restricted to, use for one or more Sony® platforms and/or one or more Sony® PlayStation® platforms corresponding to one or more types of Sony® devices, such as the Sony® PlayStation4®, the Sony® PlayStation5®, the Sony® PlayStation® Vita®, another Sony® PlayStation® portable gaming console, another Sony® PlayStation® home gaming console, a Sony® PlayStationVR® Virtual Reality (VR) system, a Sony® PlayStationTV® home entertainment system, a Sony® tablet, a Sony® mobile handset, or a combination thereof. In some examples, the set of video game consoles or video game platforms can be associated with more than one manufacturer, device type, form factor, operating system (OS), or combination thereof, for example allowing cross-platform support, cross-device-type support, cross-OS support, or a combination thereof.

Figure 9:
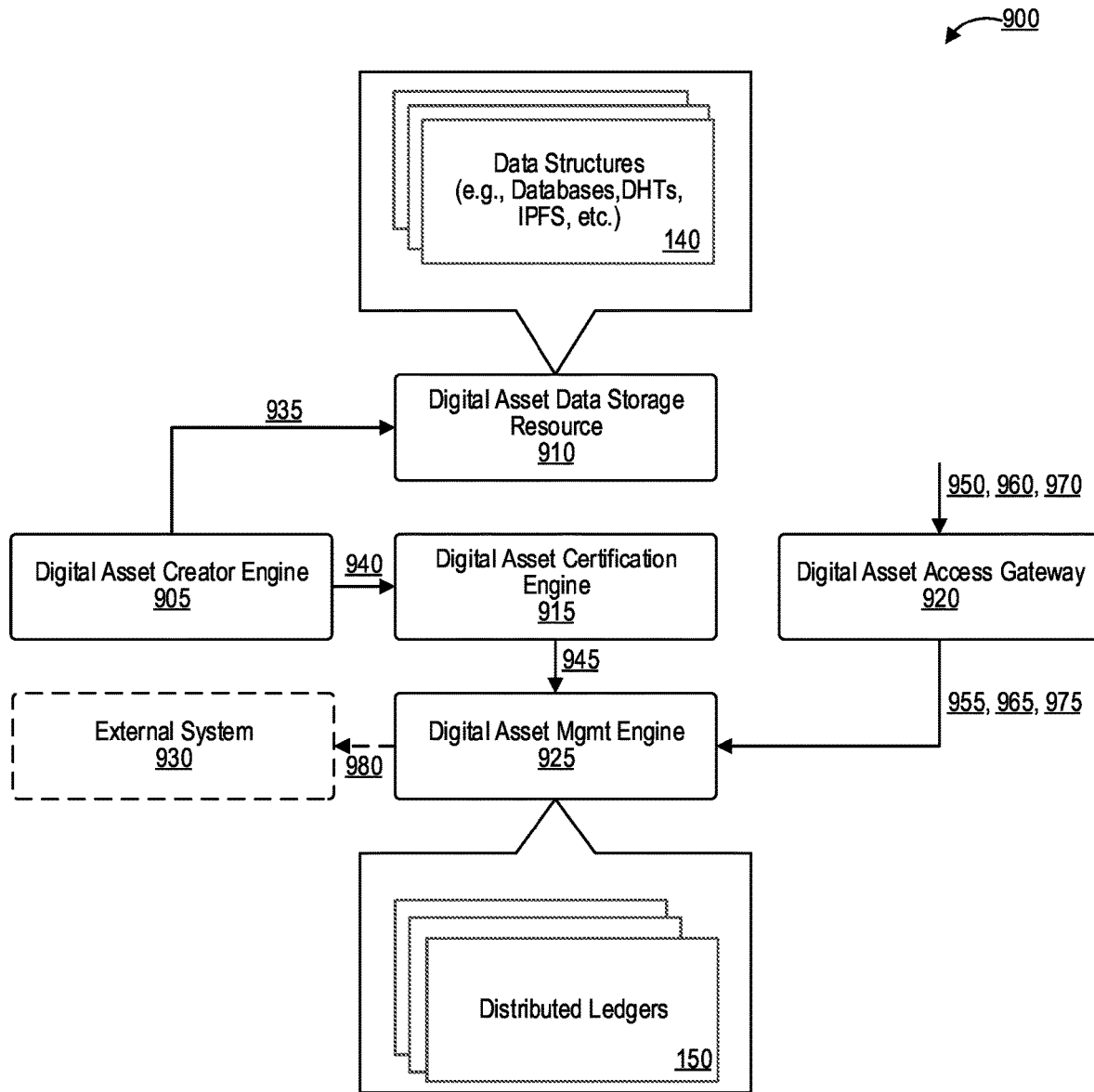
FIG. 9 is a block diagram illustrating an example network environment for management of digital assets associated with video games.

FIG. 9 is a block diagram illustrating an example network environment 900 for management of digital assets associated with video games. The network environment 900 includes a digital asset creator engine 905, a digital asset storage resource 910, a digital asset certification engine 915, a digital asset access gateway 920, and a digital asset management engine 925. In some examples, the digital asset creator engine 905 includes tools for creating a digital asset and/or validation systems to confirm whether digital assets created are valid. In some examples, the digital asset creator engine 905 creates a digital asset or identifies a digital asset to be created upon token creation. At operation 935, the digital asset creator engine 905 stores the digital asset in the digital asset data storage engine 910, which may store the digital asset in the data structures 140, for example. At operation 940, the digital asset creator engine 905 requests that the digital asset certification engine 915 certify and generate imprints, generate a token 400 corresponding to the digital asset, and generate a pointer (e.g., a URI) pointing to the network location of the digital asset stored in the digital asset data storage resource 910 (e.g., in the data structures 140) and/or to metadata about the digital asset. At operation 945, the digital asset certification engine 915 requests that the digital asset management engine 925 store the token 400 and start a history for the token 400 in a distributed ledger of the distributed ledgers 150 (e.g., blockchain ledger 300) corresponding to the token 400.

In operation 950, a request to transfer ownership of the token 400, and thus of the digital asset, is received at the digital asset access gateway 920, which may include APIs for managing digital assets and/or tokens. In operation 955, the digital asset management engine 925 may transfer ownership of the digital asset from a first user account to a second user account, for example by creating a new block of the in a distributed ledger that identifies the transaction transferring ownership of the digital asset from the first user account to the second user account. In some examples, an operation 980 may burn or delist the token 400 and related digital asset from the digital asset management engine 925 and distributed ledger and mint a new token for the digital asset using an external system with the ownership transferred to the second user account, for instance in a cross-platform transfer.

In operation 960, a request to retrieve information regarding ownership, statistics, media, and/or other metadata associated with the token 400, and thus of the digital asset, is received at the digital asset access gateway 920. In operation 965, the digital asset management engine 925 may retrieve information regarding ownership, statistics, media, and/or other metadata of the token 400, and thus of the digital asset, from the distributed ledger, and may return that information to the requesting entity, either through the digital asset access gateway 920 or directly. In some examples, such an information retrieval request may be used to simply confirm whether a token 400 and/or distributed ledger exists for a given digital asset. In some examples, if the digital asset management engine 925 determines that a token 400 and/or distributed ledger does not exist for a given digital asset, the digital asset management engine 925 can determine that the digital asset (e.g., an in-game item) may have been introduced into a video game through illegitimate techniques, such as cheating. Thus, the digital asset management engine 925 can use tokens 400 and distributed ledgers 150 to detect cheating in video games, granting improved security for gameplay.

In operation 970, a request to rent the token 400, and thus the digital asset, is received at the digital asset access gateway 920. In some examples, in operation 975, the digital asset management engine 925 may grant a second user a temporary rental license (e.g., through a token smart contract 445) to use the token 400, and thus the digital asset, without transferring ownership of the token 400 or the digital asset from the first user to the second user. In some examples, in operation 975, the digital asset management engine 925 may temporarily transferring ownership of the token 400, and thus the digital asset, from the first user to the second user, without allowing the second user to sell or otherwise transfer ownership during their temporary ownership period (e.g., through a token smart contract 445). The digital asset management engine 925 may automatically revert the ownership back to the first user after the rental license period expires (e.g., through a token smart contract 445).

Figure 10A:
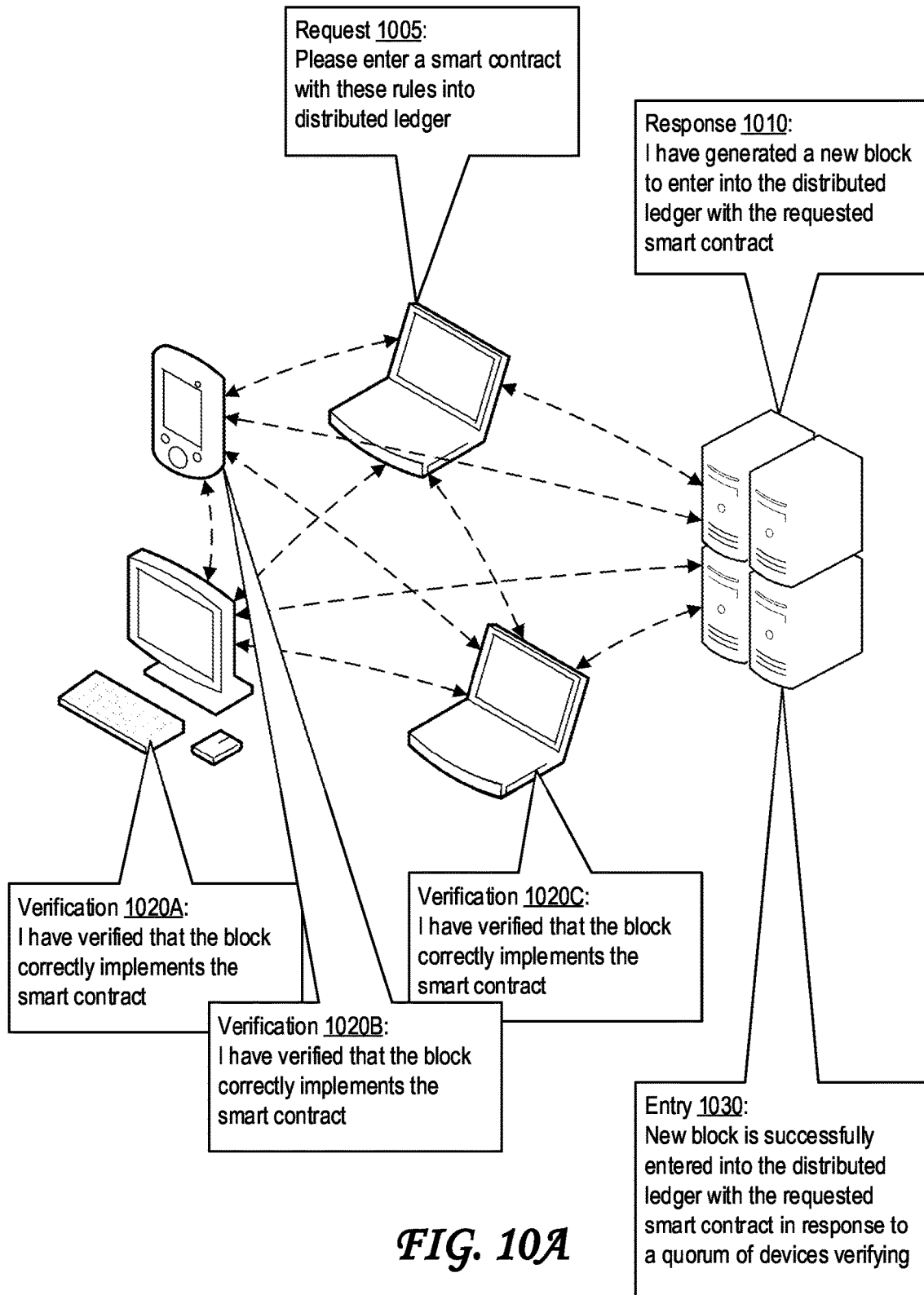
FIG. 10A is a conceptual diagram illustrating generation of a smart contract and entry of the smart contract into a distributed ledger, according to an aspect of the present disclosure.

FIG. 10A is a conceptual diagram 1000 illustrating generation of a smart contract and entry of the smart contract into a distributed ledger, according to an aspect of the present disclosure. The distributed computing architecture includes multiple computing systems (referred to here as computers), which may be entertainment systems 1500, that store and modify the distributed ledger. A first computer submits a request 1005 requesting entry of a smart contract with particular rules into distributed ledger. A second computer submits a response 1010 indicating that the second computer has generated a new block to enter into the distributed ledger with the requested smart contract. Third, fourth, and fifth computers submit verification 1020A-1020C indicating that they have verified that the block correctly implements the smart contract, that the code of the smart contract can be executed (e.g., does not include syntax errors or other errors), that all parties involved in the smart contract have submitted agreement to the terms of the smart contract, that on-chain pointers correctly point to valid off-chain smart contract code, and/or that sufficient funds are allocated in order to pay for execution fee charges for the intended payload element. The second computer submits and entry confirmation indicating that the new block is successfully entered into the distributed ledger with the requested smart contract in response to a quorum of devices verifying.

A similar process to the process illustrated in FIG. 10A may be used to enter tokens, with the corresponding verification 1020A-1020C verifying, for instance, that the token refers to a valid type of digital asset, that on-chain pointers correctly point to valid off-chain media or metadata, and/or that sufficient funds are allocated in order to pay for execution fee charges for the intended payload element. A similar process to the process illustrated in FIG. 10A may be used to enter transaction, with the corresponding verification 1020A-1020C verifying, for instance, whether the transferor has a sufficient quantity of an asset (e.g., whether the transferor owns the token to be transferred) for the transaction to take place and/or that sufficient funds are allocated in order to pay for execution fee charges for the intended payload element.

Figure 10B:
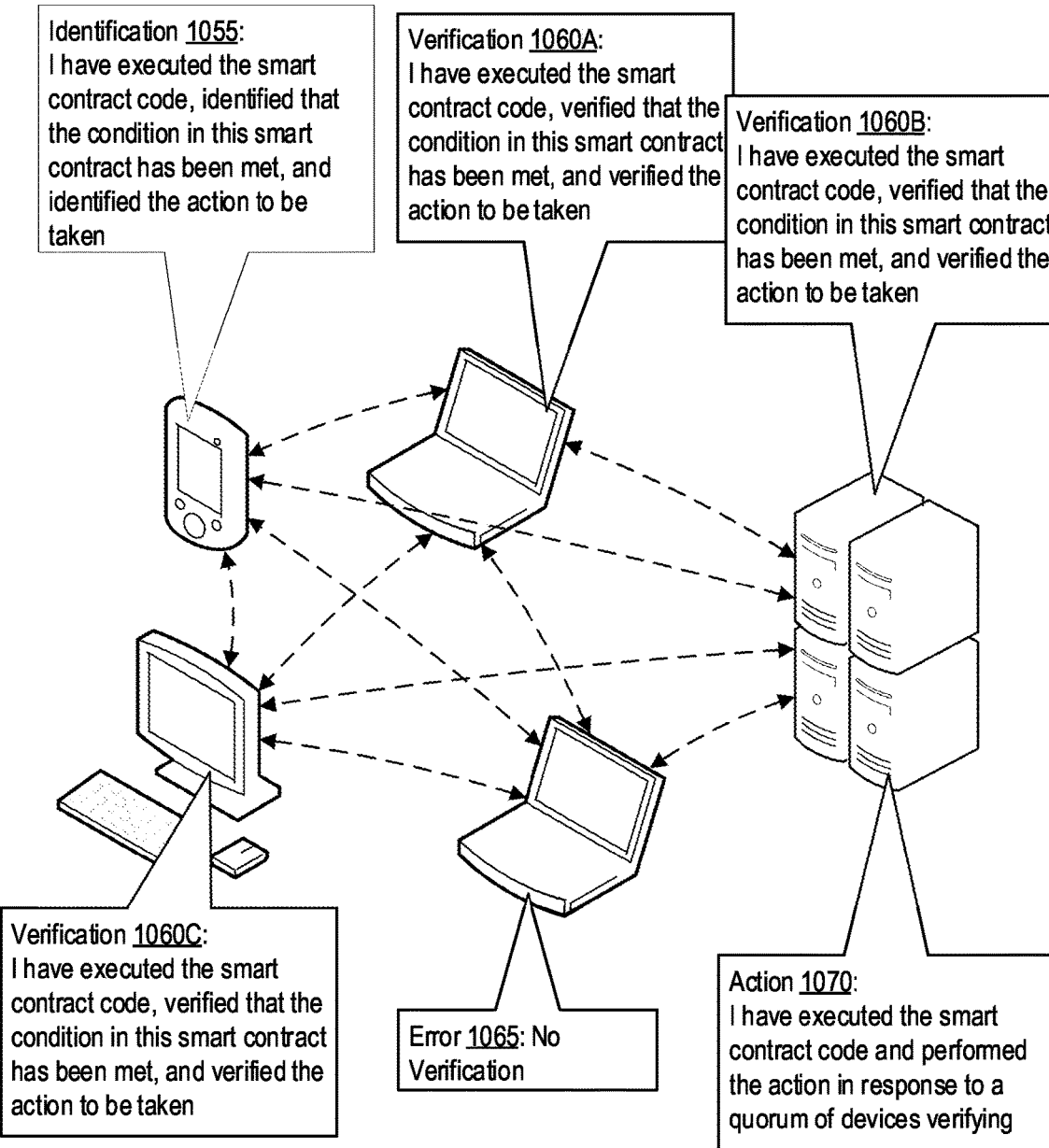
FIG. 10B is a conceptual diagram illustrating execution of a smart contract, according to an aspect of the present disclosure.

FIG. 10B is a conceptual diagram 1050 illustrating execution of a smart contract, according to an aspect of the present disclosure. A first computer submits an identification 1005 that the first computer has executed the smart contract code, identified that the condition in this smart contract has been met, and identified the action to be taken. Second, third, and fourth computers submit verifications 1010A-1010C that identify that the second, third, and fourth computers have executed the smart contract code, verified that the condition in this smart contract has been met, and verified the action to be taken. A fifth computer indicates an error 1015 with no verification. The third computer indicates an action 1020, indicating that the third computer has executed the smart contract code and performed the action in response to a quorum of devices verifying (e.g. the verifications 1010A-510C).

Figure 11:
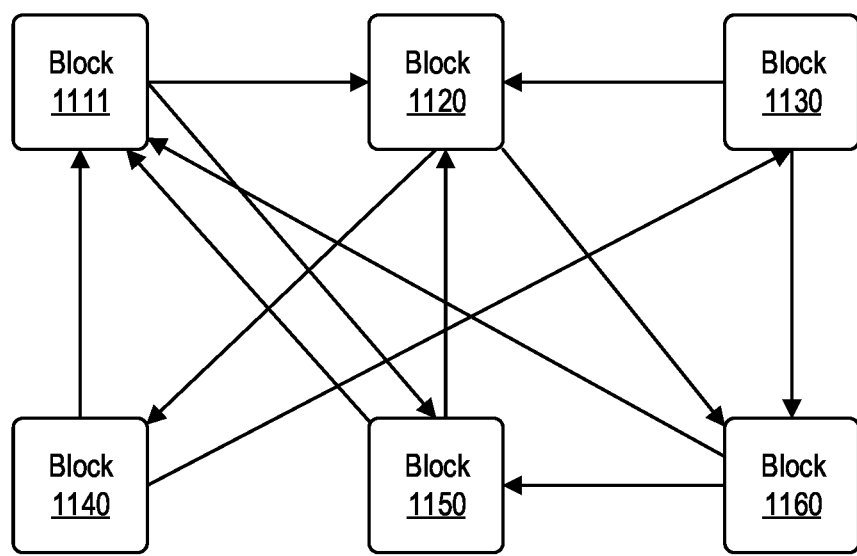
FIG. 11 is a block diagram illustrating a directed acyclic graph (DAG) ledger configured to track a digital asset associated with a video game, according to an aspect of the present disclosure.

FIG. 11 is a block diagram illustrating a directed acyclic graph (DAG) ledger 1100 configured to track a digital asset associated with a video game, according to an aspect of the present disclosure. While FIG. 3 discusses use of a blockchain ledger 300, it should be understood that a non-linear ledger structure, such as the directed acyclic graph (DAG) ledger structure of FIG. 11, may be used instead of or in addition to the blockchain ledger 300 discussed herein. The term "distributed ledger" as used herein should be understood to refer to at least one of a blockchain ledger 300 (as in FIG. 3), a DAG ledger 1100 (as in FIG. 11), or a combination thereof. In a DAG ledger, each block header includes the hashes of blocks, or block headers, of a predetermined number of other "parent" blocks in the DAG ledger selected either at random or in some other non-linear manner, rather than the hash of a single previous block in the blockchain. Where each block header includes multiple hashes corresponding to different parent blocks or their headers, these hashes can be combined together using a Merkle root For example, in the DAG ledger of FIG. 11, the predetermined number is two, at least after the first two blocks are generated. In the web DAG ledger of FIG. 11, the parent blocks are indicated using arrows. Block 1110 includes hashes of the block headers of parent blocks 1120 and 1150. Block 1120 includes hashes of the block headers of parent blocks 1140 and 1160. Block 1130 includes hashes of the block headers of parent blocks 1120 and 1160. Block 1140 includes hashes of the block headers of parent blocks 1110 and 1130. Block 1150 includes hashes of the block headers of parent blocks 1110 and 1120. Block 1160 includes hashes of the block headers of parent blocks 1110 and 1150. The resulting structure is a directed acyclic graph (DAG) of blocks, where each vertex block includes a hash of its parent vertex block(s), rather than a linear stream of blocks as in a blockchain. A DAG ledger may sometimes be referred to as a "web," a "tangle," or a "hashgraph."

In some examples, the number of parent blocks of a given block in a DAG ledger is not predetermined, but there may be a predetermined minimum number of parent blocks, such as a two-parent minimum or a one-parent minimum, meaning that each block has at least the predetermined minimum number of parent blocks. In some cases, each block in a DAG ledger may only identify only a single payload element rather than multiple payload element, and may therefore forego a Merkle root 320/350/380 of payload elements and/or replace it with a hash of the single payload element. In other implementations, each block may identify multiple payload elements associated with a predetermined time period, and/or may include a Merkle root 320/350/380 of the payload elements. Potential benefits of DAG ledgers 1100 over blockchain ledgers 300 may include parallelized validation, which may result in higher throughput.

FIG. 12 is a block diagram illustrating an example network environment 1200 in which a video game digital media significance engine may be implemented, according to an aspect of the present disclosure. The network environment 1200 includes a client device 1202, a third party device 1212, a cloud gaming server system 1272 with a drama engine 1214 and an artificial intelligence (AI) server 1234, and a plurality of drama engine data structures 1250. The video game digital media significance engine may include the cloud gaming server system 1272, the drama engine 1214, the AI server 1234, the drama engine data structures 1250, or a combination thereof.

The client device 1202 can be a user device 130, a console 228, a video game console, computing system, an entertainment system 1500, or a combination thereof. The client device 1202 can store and/or execute a gaming application, through which a player can play a video game. The client device 1202 can include, or be coupled to, a user interface such as a video game controller, a joystick, a remote control, a keyboard, a keypad, a touchscreen, a trackpad, or a combination thereof. As part of executing the gaming application, the client device 1202 can generate and/or render 2D and/or 3D graphics (e.g., representing in-game digital assets), can perform physics simulations (e.g., affecting in-game digital assets), can perform collision detection (e.g., for collisions of in-game digital assets), can connect to other client devices 1202 for networked multiplayer gaming (e.g., in some cases though an intermediary multiplayer network server), or a combination thereof. In some examples, the client device 1202 is a Sony® PlayStation® device.

In another embodiment, the gaming application may be executing at a back-end processor operating at a back-end game server of a cloud game network or cloud gaming server system 1272. For example, the cloud gaming server system 1272 may include a plurality of virtual machines (VMs) running on a hypervisor of a host machine, with one or more virtual machines configured to execute a gaming application utilizing the hardware resources available to the hypervisor of the host in support of single player or multiplayer video games. In that case, the client device 1202 is configured for requesting access to a gaming application over a network, such as the internet, and for streaming, receiving, and/or rendering instances of video games or gaming applications executed by a processor at the cloud gaming server system 1272 and delivering the rendered instances (e.g., audio and video) to a display device associated with the user device 1202 and the player, such as a display screen, a projector and/or a head-mounted display (HMD). For example, a player interact with the video game through client device 1202 while an instance of a gaming application associated with the video game executes on the cloud gaming server system 1272. During execution, at least some of the logic of the gaming application may be run by the cloud gaming server system 1272 and/or a server game engine.

The client device 1202 also includes a data capture engine 1204 that captures gameplay metadata 1262 related to the gameplay of player, from the execution of the gaming application on the client device 1202, from the streaming of gameplay from the cloud gaming server system 1272 while the gameplay application executed on the cloud gaming server system 1272, or a combination thereof. The gameplay metadata 1262 may include OS context (e.g., which OS is running, which software is running OS), information related to times of certain hardware operations (e.g., buttons actuated, buttons released, joystick angle, joystick direction, joystick movements, speed of actuation, time of gameplay), user profile data (e.g., how long the player plays a gaming application, when the last time the player played a gaming application, how often the player requests assistance, how skilled the player is compared to other players), or a combination thereof. Gameplay metadata 1262 may be captured at various points in the progression of playing the gaming application, such as in the beginning of a level, the end of the level, and/or one or more points within the level between the beginning and the end. Gameplay metadata 1262 may help determine where the player (e.g., character of the player) has been within the gaming application, where a player character of the player is in an in-game area of the video game, what the player has done within the video game, what in-game assets and/or skills the player or the player character has accumulated and/or used within the video game, what quests or tasks are presented to and/or accepted by the player, where the player is headed within the video game, the state of the game at that point (e.g., states of in-game characters, in-game items, in-game costumes, and/or in-game areas), the state of certain hardware elements, (CPU, GPU, memory, register values, program counter value, programmable DMA state, buffered data for the DMA, audio chip state, CD-ROM, DVD-ROM, Blu-ray drive), which in-game area the player character is in, the level or version of the gaming application, the in-game items held in the player character's inventory (e.g., weapons, tools, bombs, etc.), the type or race of the player character (e.g., wizard, soldier, etc.), the current quest and/or task presented to and/or accepted by the player, the player character's loadout, the player character's skill set, the player character's level or rank, the player character's attributes, the player character's location, the number of remaining lives the player has, the total possible number of lives available, the amount of health the player has, the total possible amount of health, the amount of mana the player has, the total possible amount of mana, the amount of in-game currency the player has, the total possible amount of in-game currency, the in-game costume(s) worn and/or possessed by the player character, trophies or awards obtained by the player, achievements obtained by the player, time counter values, or combinations thereof. Gameplay metadata 1262 may include information that personalizes the video game for the player, such as control settings, display settings, audio settings, customizations to one or more in-game assets, or combinations thereof. The gameplay metadata 1262 may be sent from the client device 1202 to the cloud gaming server system 1272, including the AI server 1234 and/or to the drama engine 1214. Historical gameplay metadata 1262 can be stored in a historical data database 1258.

Images, audio clips, and/or video clips of gameplay of the video game by the player using the client device 1202 may be captured and/or recorded by the gameplay recorder 1206 of the client device 1202. Images, audio clips, and/or video clips of gameplay of the video game by the player using the client device 1202 may be captured and/or recorded by a secondary gameplay recorder (not pictured) of the cloud gaming server system 1272. The images, audio clips, and/or video clips of gameplay captured and/or recorded by the gameplay recorder 1206 and/or the secondary gameplay recorder may be referred to as gameplay recordings 1268, and the client device 1202 may send the gameplay recordings 1268 to the drama engine 1214, the AI server 1234, and/or the cloud gaming server system 1272.

Images, audio clips, and/or video clips of responses and/or reactions of the player, another player (e.g., an opponent or a collaborator), and/or an audience to gameplay of the video game by the player using the client device 1202 may be captured and/or recorded by the live capture device 1208 of the client device 1202. These responses and/or reactions may be used for further analysis (e.g., to determine events or events of dramatic significance). The images, audio clips, and/or video clips of responses and/or reactions captured and/or recorded by the live capture device 1208 may be referred to as player reaction 1266, and the client device 1202 may send the player reaction 1266 to the drama engine 1214, the AI server 1234, and/or the cloud gaming server system 1272.

The cloud gaming server system 1272 can receive, over a network and from the client device 1202, the gameplay metadata 1262 with contextual data corresponding to gameplay of the player playing the video game using the client device 1202. The cloud gaming server system 1272 can identify an event of dramatic significance that occurred, is occurred, or is set to occur in gameplay of a video game by the player using the client device 1202, based on the gameplay metadata 1262 and/or historical data. The event of dramatic significance is distinguished from ordinary events (e.g., sub-events) occurring within a gameplay, wherein the ordinary events may transpire to achieve progress through the gaming application, but do not necessarily reach a high level of drama and/or significance. The event of dramatic significance can be associated with a challenge that may be coded into the gaming application of the video game, discovered by one or more players while playing the video game, and/or based on matching the gameplay metadata 1262 to one or more of a plurality of statistical patterns of dramatic significance.

The AI server 1234 of the cloud gaming server system 1272 can generate event classifiers for various types of events using the event classification modeler 1248 and one or more trained machine learning models in a machine learning (ML) engine 1236 trained using the event training data in an event training data database 1254. Event classifiers may be stored in the event classifiers database 1252. The AI server 1234 of the cloud gaming server system 1272 can identify various events in the gameplay metadata 1262 by matching events of dramatic significance occurring during the gameplay of a player to events (of dramatic significance or otherwise) modeled or recognized using the event classification modeler 1248 using the event identifier 1238 and one or more trained machine learning models in a machine learning (ML) engine 1236 trained using event training data in an event training data database 1254.

The AI server 1234 of the cloud gaming server system 1272 can identify the event of dramatic significance in the gameplay metadata 1262 using the event of dramatic significance identifier 1240, which may be based on one or more trained machine learning models in a machine learning (ML) engine 1236, a pattern engine 1242 with a statistical pattern scoring engine 1246 and/or a statistical pattern matching engine 1244, and/or a statistical patterns of dramatic significance database 1256. The AI server 1234 of the cloud gaming server system 1272 can identify the event of dramatic significance in the gameplay metadata 1262 by matching the gameplay metadata 1626, and/or one or more events (classified or not) identified therefrom, to one or more of a plurality of statistical patterns of dramatic significance, such as those stored in the statistical patterns of dramatic significance database 1256. The one or more trained machine learning models in a machine learning (ML) engine 1236 can include deep learning models. The one or more trained machine learning models in a machine learning (ML) engine 1236 can include neural networks, such as convolutional neural networks (CNNs). Statistical patterns of dramatic significance can include, for example, a last second win, a come from behind victory, a personal record, a universal record, a player reaching a personal record, a universal record, doing something new or rare, accomplishing a difficult task or challenge, overcoming a personal or universal negative trend, achieving a personal or universal positive trend, or combinations thereof. In some examples, a statistical pattern of dramatic significance and/or an event of dramatic significance may be identified based on a reaction of the player of the video game on the client device 1202, another player (e.g., a competitor or a collaborator), an audience, and/or a commentator in response to a certain event.

A story template comparator 1275 can be used to identify and/or match a sequence of events within one or more recordings of gameplay of one or more players to a story template for purposes of building a packaged video game digital media asset 1274 using the media package generator 1224. A packaged video game digital media asset 1274 can include gameplay recordings that were performed synchronously or asynchronously, but were identified and/or matched to tell a story following a story template. Story templates may define dramatic storylines, such as the underdog, the come-from-behind win, the blow-for-blow performance between two gameplays, the photo finish, the Hail Mary pass to win the game, the single-player record, the multi-player record, the agony of defeat, the rookie who wins the game, the player down on their luck who eventually wins the game, other events of dramatic significance identified herein, or combinations thereof.

In some examples, an event of dramatic significance may be identified through matching of one or more statistical patterns of dramatic significance. For example, the statistical pattern matching engine 1244, with cooperation of the deep learning engine 1236, can be configured to match data collected from the gameplay (e.g., relating to an event) of a player to with one or more statistical patterns of dramatic significance that are modeled and stored in statistical patterns of dramatic significance database 1256. For example, statistical patterns of dramatic significance may include, but is not limited to, the following: threshold, novelty, rarity, difficulty, world record, regional record, personal record, negative trend, positive trends, or combinations thereof. The statistical pattern scoring engine 1246 is configured to score the matching performed by statistical pattern matching engine 1244. When the total score meets or exceeds a threshold, is a minimum, is a maximum, or some combination thereof the data is determined to be an event of dramatic significance.

In some cases, the information generator 1216 can generate information that may be related to events of dramatic significance, historical gameplays that help define why that event is so dramatic, or important within the context of the history of the video game, or generate information that personalizes the dramatic significance to the player. The information may be generated and/or stored in historical data database 1258. The information delivery engine 1220 may send the information to the client device 1202 and/or one or more third party devices 1212. The data surfacing engine 1210 on the client device 1202 may be configured to identify events of dramatic significance and/or such descriptive information at the client device 1202, alongside or overlaid over the gameplay. The information may also be sent as information 1270 to a third party device 1212, such as a device or a commentator or a client device of another player playing a multiplayer match with or against the player associated with the client device 1202. The commentator can add live and/or recorded narration and/or commentary, which can be included as part of the packaged video game digital media asset 1274 along with reactions of the player, other players (such as opponents or collaborators), and/or audiences. The gameplay and/or commentary may be live or pre-recorded, and may for example be streamed live or after the fact using the broadcast/streaming engine 1228.

Narration may be automatically generated based on the information, such as by the narration generator 1218. For example, the narration may include the information previously described (e.g., relating to personal and universal historical context associated with the event of dramatic significance), and presented with other canned information (e.g., to help merge the information into a flowing commentary of the gameplay). The narration and the recorded portion of the gameplay can be merged to generate the media package (e.g., highlight reel) that is shareable, such as by sharing engine 1226, over a social networking website or application. That is, the narration may be presented in the packaged video game digital media asset 1274 along with the gameplay of the player to include the event of dramatic significance. In addition, the reaction(s) 1266 of the player playing the gaming application may also be captured, as previously described. The reaction(s) correspond to the event of dramatic significance. The reaction(s) may also be merged into the packaged video game digital media asset 1274. The packaged video game digital media assets 1274 can be stored in the media packages database 1260. A highlight reel can be a type of video game digital media assets 1274 that can be automatically generated including the one or more portions of the gameplay corresponding to the plurality of events of dramatic significance. For example, the highlight reel generator 1230 is configured to automatically generate a highlight reel of one or more events in a player's gameplay. Narration, commentary, player reactions, and/or audience reactions may be merged into the highlight reel. A slow-motion (slo-mo) replay may be generated by a slo-mo generator 1232 of one or more portions of events, or one or more events, in a video game digital media assets 1274.

In some examples, the validation enforcement engine 1222 can validate an event of dramatic significance that is identified. For example, engine 1222 may be configured for receiving confirmation from the player validating the event of dramatic significance. In one implementation, the confirmation may be in the form of a tag 1264 delivered by the player through the client device 1202. In some examples, the confirmation may be through biometric signals of the player as detected through sensors in association with the client device 1202. For example, when an event of dramatic significance is being experienced by the corresponding player, his or her biometric signals may indicate elevated excitement of the player. In that manner, the data collected in association with the event of dramatic significance may be stored as event training data in database 1254, and used as updated training data for defining a corresponding modeled event of dramatic significance.

FIG. 13 is a block diagram illustrating examples of pointer elements 1305 that can point users to a digital asset 1360 associated with a video game, an associated token 1355, and/or an associated distributed ledger 1350, according to an aspect of the present disclosure. The pointer elements 1305 include, for example, bar codes 1310, quick response (QR) codes 1315, near-field communication (NFC) tags 1320, wireless transceivers 1325, uniform resource indicators (URIs) 1330, ArUco markers, Aztec codes, Maxicodes, PDF417 barcodes, data matrices, binary square markers, Codablock F codes, MicroPDF codes, Micro QR codes, Han Xin codes, dotcodes, other types of pointer elements, or combinations thereof. In some examples, the pointer elements 1305 can be included on or inside a physical object representing the digital asset 1360 associated with a video game. For example, NFC tags 1320 and/or other wireless transceivers 1325 can be inside the physical object and/or on a surface of the physical object. URIs 1330 or optical glyphs (e.g., barcodes 1310, QR codes 1315, Aztec codes, and the like) can be printed on and/or or adhered to a surface of the physical object.

If the digital asset 1360 is an in-game digital asset, the physical object may be a 3D model of the digital asset 1360, a trading card with an image of the digital asset 1360, another type of image of the digital asset 1360, a tag with data about the digital asset 1360, some other physical representation of the digital asset 1360, or a combination thereof. If the digital asset 1360 is an video game digital media asset, the physical object may be a 3D model of a scene depicted by the digital asset 1360, a trading card with an image or screenshot of the digital asset 1360, another type of image or screenshot of the digital asset 1360, a tag with data about the digital asset 1360, some other physical representation of the digital asset 1360, or a combination thereof.

The pointer elements 1305 can point to a location (on a network and/or device) at which one or more copies of digital asset 1360 are stored. For example, the pointer elements 1305 can encode a URI pointing to the location at which the digital asset 1360 is stored. The pointer elements 1305 can point to a location (on a network and/or device) at which one or more copies of the distributed ledger 1350 corresponding to the digital asset 1360 (and/or a corresponding token 1355) are stored. For example, the pointer elements 1305 can encode a URI pointing to the location at which the distributed ledger 1350 and/or the corresponding token 1355 is stored. The pointer elements 1305 can point to a location (on a network and/or device) at which the token 1355 is stored. For example, the pointer elements 1305 can encode a URI pointing to the location at which the token 1355 is stored. The token 1355 can be a token 400 as in FIG. 4 corresponding to the digital asset 1360. The distributed ledger 1350 can be a blockchain ledger 300, a DAG ledger 1100, or another type of distributed ledger. The distributed ledger 1350 can store the token 1355, the digital asset 1360, a pointer to the digital asset 1360, and/or an identifier of the digital asset 1360. Scanning (e.g., using a camera and/or barcode scanner), reading, receiving information from, or otherwise interacting with one of the pointer elements 1305 using a device (e.g., a mobile handset or entertainment system 1500) can decode the pointer or URI to the location(s) of the digital asset 1360, the token 1355, and/or the distributed ledger 1350, and can direct the device to the location(s) of the digital asset 1360, the token 1355, and/or the distributed ledger 1350.

In some cases, the pointer elements 1305 can encode instructions to add a certain type of transaction, introduce a smart contract, execute a smart contract, execute an action that maybe a criterion for executing a smart contract, mint a token 1355, transfer ownership of a token 1355, license a token 1355, burn a token 1355, another addition to the payload of the distributed ledger 1350, another addition or modification to off-chain data that is pointed to by on-chain pointers on the distributed ledger 1350, or a combination thereof. Scanning (e.g., using a camera and/or barcode scanner), reading, receiving information from, or otherwise interacting with one of the pointer elements 1305 using a device (e.g., a mobile handset or entertainment system 1500) can decode the pointer or URI, and can add a payload element to the distributed ledger 1350, such as a transaction, token 1355, smart contract, smart contract execution, or other payload element. Thus, scanning (e.g., using a camera and/or barcode scanner), reading, receiving information from, or otherwise interacting with one of the pointer elements 1305 using a device (e.g., a mobile handset or entertainment system 1500) can decode the pointer or URI, and can add to a history of the digital asset 1360 and/or the token 1355 as recorded in the distributed ledger and/or off-chain data structures pointed to by on-chain pointers, for example adding a use of the digital asset 1360 and/or the token 1355, a change in ownership of the digital asset 1360 and/or the token 1355, a change in licensing of the digital asset 1360 and/or the token 1355, a change in visual appearance of the digital asset 1360 and/or the token 1355, a change in in-game properties of the digital asset 1360 and/or the token 1355, a change in other properties or attributes of the digital asset 1360 and/or the token 1355, another history-recorded change for the digital asset 1360 and/or the token 1355 described herein, or some combination thereof.

Figure 14A:
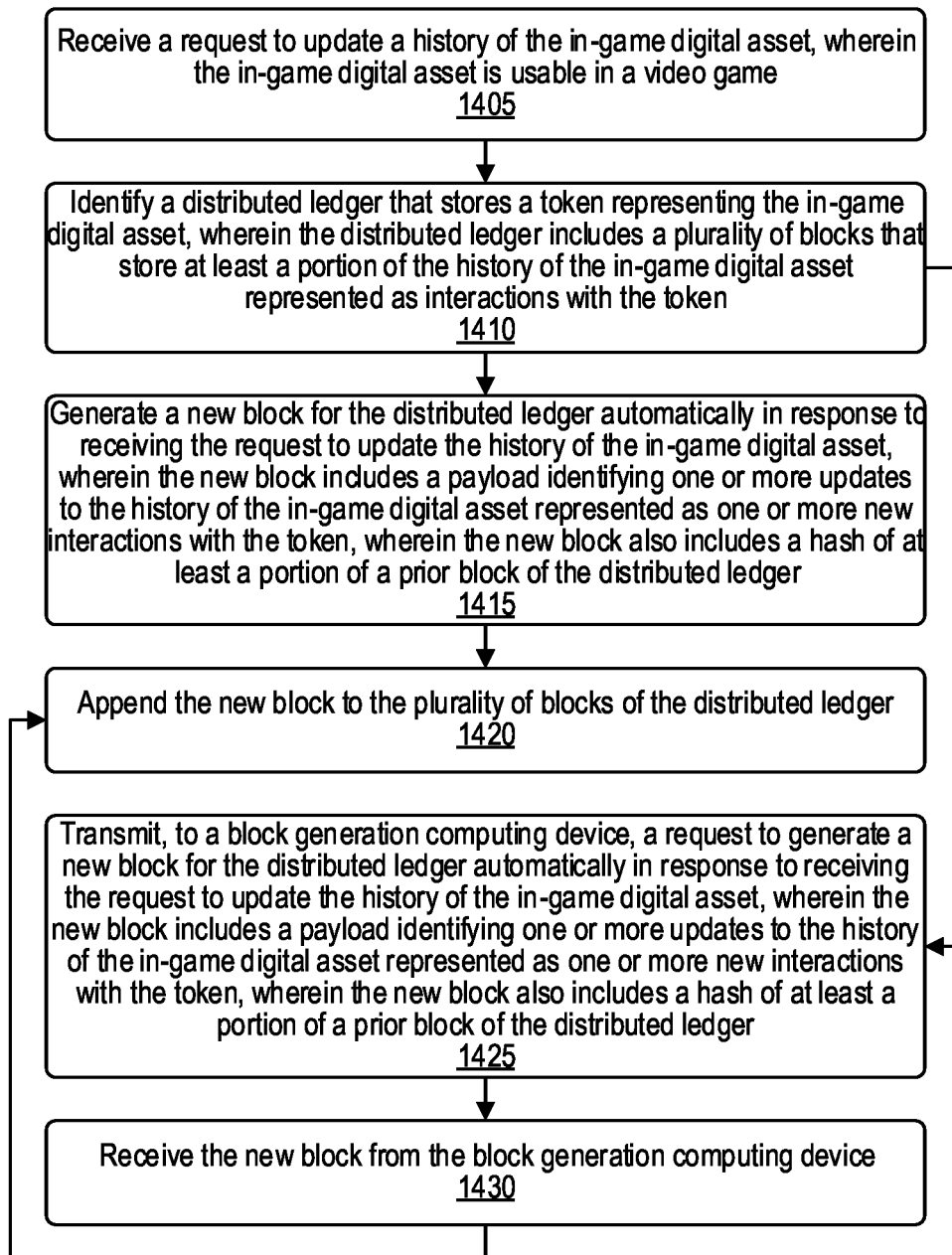
FIG. 14A is a flow diagram illustrating operations for tracking an in-game digital asset using a distributed ledger, according to an aspect of the present disclosure.

FIG. 14A is a flow diagram illustrating operations 1400 for tracking an in-game digital asset using a distributed ledger, according to an aspect of the present disclosure. At least a subset of the operations 1400 can be performed by a digital asset tracking system, which may include, for example, the network environment 100, the one or more interactive content servers 110, the one or more platform servers 120, the one or more user devices 130, the one or more data structures 140, one or more distributed ledgers 150, the network environment 200, the console 228, the one or more servers 218, the blockchain ledger 300, the network environment 900, the digital asset creator engine 905, the digital asset storage resource 910, the digital asset certification engine 915, the digital asset access gateway 920, the digital asset management engine 925, the digital asset tracking system that performs the operations 1450, the entertainment system 1500, or a combination thereof.

At operation 1405, the digital asset tracking system receives a request to update a history of the in-game digital asset. The in-game digital asset is usable in a video game. Operation 1405 can be followed by operation 1410. The in-game digital asset may include, for example, at least one of an in-game item, an in-game character, an in-game costume, an in-game area, or a combination thereof. Examples of the in-game digital asset include, for example, the objects of FIG. 2A-2B, the off-chain media of FIG. 4, the player character 505, the treasure chest 510, the laser rifle 515, the plasma sword 520, the energy pistol 525, the no-scope laser rifle 620, the silenced laser rifle 625, the sawn-off laser rifle 630, the player character 710, the player character 720, the in-game digital assets 810, the in-game items 815, the spicy herb of FIG. 8A, the in-game costumes 820, the top hat of FIG. 8A, the explorer outfit of FIG. 8A, the in-game areas 825, the factory of FIG. 8A, the future earth of FIG. 8A, certain digital assets created by the digital asset creator engine 905, certain digital assets stored in the digital asset data storage resource 910 at operation 935, certain digital assets for which tokens are created by the digital asset certification engine 915 at operation 940, or a combination thereof. In some examples, the in-game digital asset may include a save file and/or a ghost.

At operation 1410, the digital asset tracking system identifies a distributed ledger that stores a token representing the in-game digital asset. The distributed ledger includes a plurality of blocks that store at least a portion of the history of the in-game digital asset represented as interactions with the token. Operation 1410 can be followed by operation 1415 or by operation 1425. Examples of the token include the token 400 of FIG. 4, the token created by the digital asset certification engine 915 at operation 940, a token stored in a payload 330/360/390 of the blockchain ledger 300, or a combination thereof. Examples of the distributed ledger include the blockchain ledger 300 of FIG. 3, the DAG ledger of FIG. 11, and the distributed ledgers 150 of FIGS. 1, 2A, and 9. An example of the history of the in-game digital asset is illustrated in the history 660 and/or a history of owners 665.

The token can include a unique identifier, such as the token identifier 410. The token can identify the in-game digital asset. The token can identify the in-game digital asset in some cases by including a pointer to a network location at which the in-game digital asset is stored. The in-game digital asset can be stored off-chain as off-chain media. The pointer can thus be the on-chain pointers to off-chain media 435 of FIG. 4. The pointer can be a uniform resource indicator (URI), such as a uniform resource locator (URL). The network location can be includes storage of the in-game digital asset on an interplanetary file system (IPFS), a DHT, or another one of the data structures 140. The token can include metadata identifying one or more attributes of the in-game digital asset, so that the distributed ledger stores the metadata. The token can thus include the token unit quantity 415, the token ownership 420, the on-chain immutable metadata 425, and/or the on-chain mutable metadata 430. The token can include a pointer to a network location that stores metadata identifying one or more attributes of the in-game digital asset, so that the distributed ledger stores the pointer. The token can thus include the on-chain pointers to off-chain metadata 440.

At operation 1415, the digital asset tracking system generates a new block for the distributed ledger automatically in response to receiving the request to update the history of the in-game digital asset, wherein the new block includes a payload identifying one or more updates to the history of the in-game digital asset represented as one or more new interactions with the token, wherein the new block also includes a hash of at least a portion of a prior block of the distributed ledger. Operation 1415 can be followed by operation 1420. The new block of operation 1425 may be an example of the new block of operation 1415.

At operation 1425, the digital asset tracking system transmits, to a block generation computing device, a request to generate a new block for the distributed ledger automatically in response to receiving the request to update the history of the in-game digital asset, wherein the new block includes a payload identifying one or more updates to the history of the in-game digital asset represented as one or more new interactions with the token, wherein the new block also includes a hash of at least a portion of a prior block of the distributed ledger. The new block also includes a hash of at least a portion of a prior block of the distributed ledger.

Operation 1425 can be followed by operation 1430. The new block of operation 1415 may be an example of the new block of operation 1425. At operation 1405, the digital asset tracking system receives the new block from the block generation computing device. Operation 1430 can be followed by operation 1420.

In some examples, the request to update the history of the in-game digital asset is based on a request to update a property of the in-game digital asset. The payload of the new block identifies the one or more updates to the history of the in-game digital asset at least by identifying one or more updates to the property of the in-game digital asset. The property of the in-game digital asset can include an in-game visual appearance of the in-game digital asset, so that the one or more updates to the property of the in-game digital asset include one or more changes to the in-game visual appearance of the in-game digital asset. Examples of updates to a visual appearance of an in-game digital asset are illustrated in the customizations 610 of FIG. 6A. The property of the in-game digital asset includes an in-game functionality of the in-game digital asset, so that the one or more updates to the property of the in-game digital asset include one or more changes to the in-game functionality of the in-game digital asset. Examples of the in-game functionality of the in-game digital asset are identified in the statistics of the in-game digital assets 810, such as the values for accuracy, damage, stealth, health, and the like.

The property of the in-game digital asset can include an ownership of the in-game digital asset, so that the one or more updates to the property of the in-game digital asset include an change to the ownership of the in-game digital asset from a first owner account to a second owner account based on execution of one or more smart contracts. A change to the ownership is illustrated in the buy button 670, the history 660, and the ownership 665 of FIG. 6B, the buy buttons of FIG. 8A, and the operation 955. The in-game digital asset can include a license for in-game use of the in-game digital asset, so that the one or more updates to the property of the in-game digital asset include a grant of the license for in-game use of the in-game digital asset to one or more licensee accounts based on execution of one or more smart contracts. A licensing interface is illustrated in the license button 675 of FIG. 6B and the rent buttons of FIG. 8A. The request to update the history of the in-game digital asset can be based on an indication of in-game use of the in-game digital asset for an in-game action, so that the payload of the new block identifies the in-game action for which the in-game digital asset is used in-game. In-game uses of the in-game digital asset are illustrated in the history 660 of FIG. 6B.

At operation 1420, the digital asset tracking system appends the new block to the plurality of blocks of the distributed ledger.

In some examples, the digital asset tracking system creates the distributed ledger associated with the in-game digital asset in response to receipt of an indication regarding creation of the in-game digital asset. The indication can indicate that the in-game digital asset was created, that creation of the in-game digital asset is pending, or that the in-game digital asset is queued up to the created. In some examples, the digital asset tracking system creates the in-game digital asset within the video game. Creation of the in-game digital asset can be performed as discussed with respect to the digital asset creator engine 905 and/or the history 660. The digital asset tracking system can generate a first block of the distributed ledger. A first payload of the first block begins the history of the in-game digital asset. The plurality of blocks includes the first block. The digital asset tracking system can create the token corresponding to the in-game digital asset at least by generating a unique identifier for the token and identifying the in-game digital asset in the token. The first payload of the first block begins the history of the in-game digital asset by referring to one or more first interactions with the token.

In some examples, the digital asset tracking system verifies that the request to update the history of the in-game digital asset is valid. Generating the new block can occur in response to verifying that the request to update the history of the in-game digital asset is valid. Verification can include some of the operations described with respect to the verification 1020A-1020C, the verification 1060A-1060C, or a combination thereof.

In some examples, the addition of the new block to the distributed ledger can complete the updating of the history of the in-game digital asset. In some examples, the updating of the history of the in-game digital asset can transfer ownership, rental license, use license, or another property of the in-game digital asset. In some examples, before generating the new block at operation 1415 or transmitting the request at block 1425, the digital asset tracking system can verify that a transferee device of a transferee user and/or a transferor device of a transferor user store a copy of the video game and/or a key for the video game. In some examples, before generating the new block at operation 1415 or transmitting the request at block 1425, the digital asset tracking system can verify that a transferee device of a transferee user and/or a transferor device of a transferor user is authorized to run and/or play a copy of the video game. In some examples, before generating the new block at operation 1415 or transmitting the request at block 1425, the digital asset tracking system can verify that a transferee device of a transferee user and/or a transferor device of a transferor user is authorized to run and/or play a copy of the video game. In some examples, before generating the new block at operation 1415 or transmitting the request at block 1425, the digital asset tracking system can verify that the transferor device of a transferor user store a copy of the in-game digital asset and/or the corresponding token of operation 1410.

In some examples, the transferor device of a transferor user uses the in-game digital asset during gameplay of the video game prior to operations 1405, 1410, 1415, 1425, and/or 1430. In some examples, the transferee device of a transferee user uses the in-game digital asset during gameplay of the video game after operations 1405, 1410, 1415, 1425, and/or 1430.

Figure 14B:
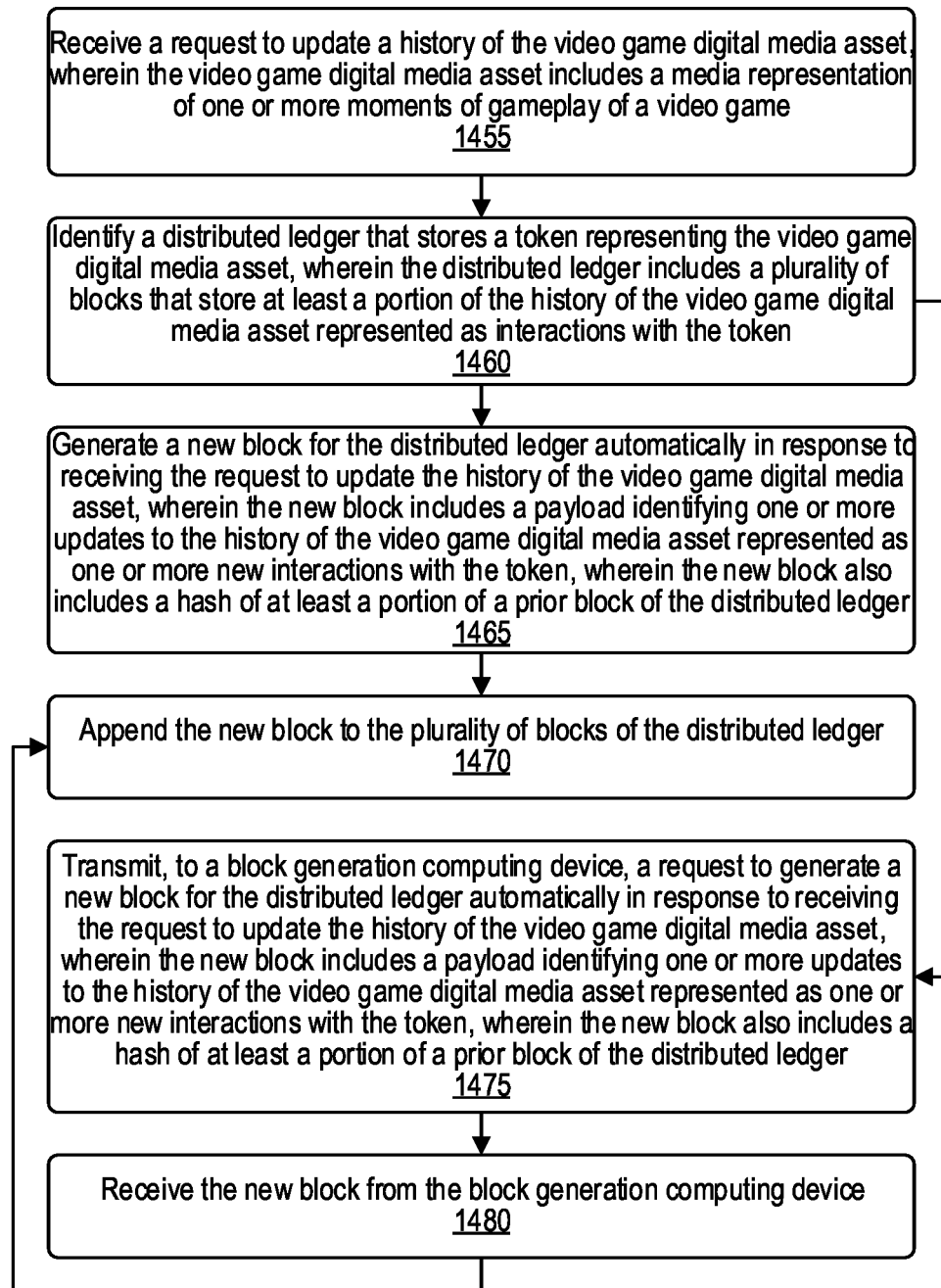
FIG. 14B is a flow diagram illustrating operations for tracking a video game digital media asset using a distributed ledger, according to an aspect of the present disclosure.

In some examples, the digital asset tracking system can perform a mixture of the operations 1400 of FIG. 14A and the operations 1450 of FIG. 14B.

FIG. 14B is a flow diagram illustrating operations 1450 for tracking a video game digital media asset using a distributed ledger, according to an aspect of the present disclosure. At least a subset of the operations 1450 can be performed by a digital asset tracking system, which may include, for example, the network environment 100, the one or more interactive content servers 110, the one or more platform servers 120, the one or more user devices 130, the one or more data structures 140, one or more distributed ledgers 150, the network environment 200, the console 228, the one or more servers 218, the blockchain ledger 300, the network environment 900, the digital asset creator engine 905, the digital asset storage resource 910, the digital asset certification engine 915, the digital asset access gateway 920, the digital asset management engine 925, the digital asset tracking system that performs the operations 1400, the entertainment system 1500, or a combination thereof.

At operation 1455, the digital asset tracking system receives a request to update a history of the video game digital media asset. The video game digital media asset includes a media representation of one or more moments of gameplay of a video game. Operation 1455 can be followed by operation 1460. The media representation of the one or more moments of gameplay of the video game can include a video clip of a plurality of moments of the gameplay of the video game, such as one of the video clips 865. The media representation of the one or more moments of gameplay of the video game can include an audio clip of a plurality of moments of the gameplay of the video game, such as one of the audio clips 875. The media representation of the one or more moments of gameplay of the video game can include an image of a moment of the gameplay of the video game, such as one of the images 870. Examples of the video game digital media asset include, for example, the content of FIG. 2A, the media file 212 of FIG. 2A, the content time stamp file 214 of FIG. 2A, the object file 216 of FIG. 2A, the objects of FIG. 2A-2B, the events of FIG. 2B, the off-chain media of FIG. 4, the video game digital media asset 690, the media associated with the other elements of the history 660, the video clip 775, the video game digital media assets 860, the video clips 865, the four video clips shown in FIG. 8B, the images 870, the two images shown FIG. 8B, the audio clips 875, the two audio clips shown in FIG. 8B, certain digital assets created by the digital asset creator engine 905, certain digital assets stored in the digital asset data storage resource 910 at operation 935, certain digital assets for which tokens are created by the digital asset certification engine 915 at operation 940, the packaged video game digital media asset 1274, or a combination thereof. In some examples, the video game digital media asset may include a save file and/or a ghost.

At operation 1460, the digital asset tracking system identifies a distributed ledger that stores a token representing the video game digital media asset. The distributed ledger includes a plurality of blocks that store at least a portion of the history of the video game digital media asset represented as interactions with the token. Operation 1460 can be followed by operation 1465 or by operation 1475. Examples of the token include the token 400 of FIG. 4, the token created by the digital asset certification engine 915 at operation 940, a token stored in a payload 330/360/390 of the blockchain ledger 300, or a combination thereof. Examples of the distributed ledger include the blockchain ledger 300 of FIG. 3, the DAG ledger of FIG. 11, and the distributed ledgers 150 of FIGS. 1, 2A, and 9. An example of the history of the video game digital media asset may be similar to the history 660 and/or a history of owners 665.

The token can include a unique identifier, such as the token identifier 410. The token can identify the video game digital media asset. The token can identify the video game digital media asset in some cases by including a pointer to a network location at which the video game digital media asset is stored. The video game digital media asset can be stored off-chain as off-chain media. The pointer can thus be the on-chain pointers to off-chain media 435 of FIG. 4. The pointer can be a uniform resource indicator (URI), such as a uniform resource locator (URL). The network location can be includes storage of the video game digital media asset on an interplanetary file system (IPFS), a DHT, or another one of the data structures 140. The token can include metadata identifying one or more attributes of the video game digital media asset, so that the distributed ledger stores the metadata. The token can thus include the token unit quantity 415, the token ownership 420, the on-chain immutable metadata 425, and/or the on-chain mutable metadata 430. The token can include a pointer to a network location that stores metadata identifying one or more attributes of the video game digital media asset, so that the distributed ledger stores the pointer. The token can thus include the on-chain pointers to off-chain metadata 440.

At operation 1465, the digital asset tracking system generates a new block for the distributed ledger automatically in response to receiving the request to update the history of the video game digital media asset. The new block includes a payload identifying one or more updates to the history of the video game digital media asset represented as one or more new interactions with the token. The new block also includes a hash of at least a portion of a prior block of the distributed ledger. Operation 1465 can be followed by operation 1470. The new block of operation 1475 may be an example of the new block of operation 1465.

At operation 1475, the digital asset tracking system transmits, to a block generation computing device, a request to generate a new block for the distributed ledger automatically in response to receiving the request to update the history of the video game digital media asset. The new block includes a payload identifying one or more updates to the history of the video game digital media asset represented as one or more new interactions with the token. The new block also includes a hash of at least a portion of a prior block of the distributed ledger. Operation 1475 can be followed by operation 1480. The new block of operation 1465 may be an example of the new block of operation 1475.

In some examples, the request to update the history of the video game digital media asset is based on a request to update metadata of the video game digital media asset, so that the payload of the new block identifies the one or more updates to the history of the video game digital media asset at least by identifying one or more updates to the metadata of the video game digital media asset. Examples of the metadata can include the token unit quantity 415, the token ownership 420, the on-chain immutable metadata 425, the on-chain mutable metadata 430, the off-chain media pointed to by the on-chain pointers to off-chain metadata 440, the statistics of FIG. 8B, or combinations thereof.

In some examples, request to update the history of the video game digital media asset is based on a request to update ownership of the video game digital media asset, so that the payload of the new block identifies the one or more updates to the history of the video game digital media asset at least by identifying a change to the ownership of the video game digital media asset from a first owner account to a second owner account based on execution of one or more smart contracts. A change to the ownership is illustrated in the buy button 670, the history 660, and the ownership 665 of FIG. 6B, the buy buttons of FIG. 8B, and the operation 955.

At operation 1455, the digital asset tracking system receives the new block from the block generation computing device. Operation 1480 can be followed by operation 1470.

At operation 1470, the digital asset tracking system appends the new block to the plurality of blocks of the distributed ledger.

In some examples, the digital asset tracking system creates the distributed ledger associated with the video game digital media asset in response to receipt of an indication regarding creation of the video game digital media asset. The indication can indicate that the video game digital media asset was created, that creation of the video game digital media asset is pending, or that the video game digital media asset is queued up to the created. In some examples, the digital asset tracking system creates the video game digital media asset within the video game. Creation of the video game digital media asset can be performed as discussed with respect to the digital asset creator engine 905 and/or the history 660. The digital asset tracking system can generate a first block of the distributed ledger. A first payload of the first block begins the history of the video game digital media asset. The plurality of blocks includes the first block. The digital asset tracking system can create the token corresponding to the video game digital media asset at least by generating a unique identifier for the token and identifying the video game digital media asset in the token. The first payload of the first block begins the history of the video game digital media asset by referring to one or more first interactions with the token.

In some examples, the digital asset tracking system verifies that the request to update the history of the video game digital media asset is valid. Generating the new block can occur in response to verifying that the request to update the history of the video game digital media asset is valid. Verification can include some of the operations described with respect to the verification 1020A-1020C, the verification 1060A-1060C, or a combination thereof.

In some examples, the addition of the new block to the distributed ledger can complete the updating of the history of the video game digital media asset. In some examples, the updating of the history of the video game digital media asset can transfer ownership, rental license, use license, or another property of the video game digital media asset. In some examples, before generating the new block at operation 1465 or transmitting the request at block 1475, the digital asset tracking system can verify that a transferee device of a transferee user and/or a transferor device of a transferor user store a copy of the video game and/or a key for the video game. In some examples, before generating the new block at operation 1465 or transmitting the request at block 1475, the digital asset tracking system can verify that a transferee device of a transferee user and/or a transferor device of a transferor user is authorized to run and/or play a copy of the video game. In some examples, before generating the new block at operation 1465 or transmitting the request at block 1465, the digital asset tracking system can verify that the transferor device of a transferor user store a copy of the video game digital media asset and/or the corresponding token of operation 1460.

In some examples, the digital asset tracking system can perform a mixture of the operations 1400 of FIG. 14A and the operations 1450 of FIG. 14B.

Figure 15:
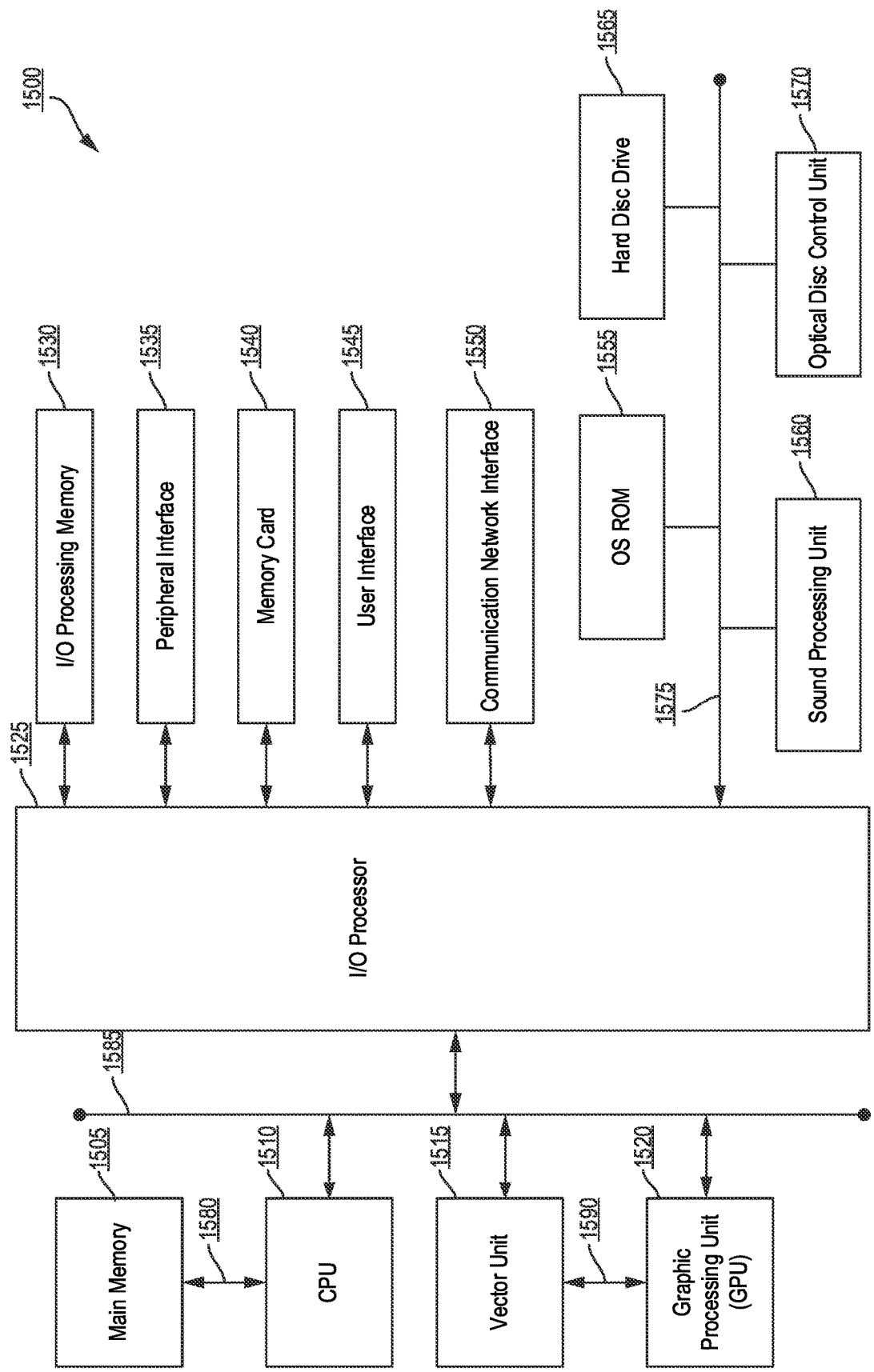
FIG. 15 illustrates an example electronic entertainment system that may be used in media-object binding and displaying real-time play data for a streaming media based on one or more objects displaying therein, according to an aspect of the present disclosure.

FIG. 15 is an example user electronic entertainment system that may be used in launching interactive content and providing dynamic interfaces, according to an aspect of the present disclosure. The entertainment system 1500 of FIG. 15 includes a main memory 1505, a central processing unit (CPU) 1510, vector unit 1515, a graphics processing unit 1520, an input/output (I/O) processor 1525, an I/O processor memory 1530, a peripheral interface 1535, a memory card 1540, a Universal Serial Bus (USB) interface 1545, and a communication network interface 1550. The entertainment system 1500 further includes an operating system read-only memory (OS ROM) 1555, a sound processing unit 1560, an optical disc control unit 1570, and a hard disc drive 1565, which are connected via a bus 1575 to the I/O processor 1525.

Entertainment system 1500 may be an electronic game console. Alternatively, the entertainment system 1500 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 1510, the vector unit 1515, the graphics processing unit 1520, and the I/O processor 1525 of FIG. 15 communicate via a system bus 1585. Further, the CPU 1510 of FIG. 15 communicates with the main memory 1505 via a dedicated bus 1580, while the vector unit 1515 and the graphics processing unit 1520 may communicate through a dedicated bus 1590. The CPU 1510 of FIG. 15 executes programs stored in the OS ROM 1555 and the main memory 1505. The main memory 1505 of FIG. 15 may contain pre-stored programs and programs transferred through the I/O Processor 1525 from a CD-ROM, DVD-ROM, or other optical disc (not shown) using the optical disc control unit 1570. I/O Processor 1525 of FIG. 15 may also allow for the introduction of content transferred over a wireless or other communications network (e.g., 4G, LTE, 1G, and so forth). The I/O processor 1525 of FIG. 15 primarily controls data exchanges between the various devices of the entertainment system 1500 including the CPU 1510, the vector unit 1515, the graphics processing unit 1520, and the peripheral interface 1535.

The graphics processing unit 1520 of FIG. 15 executes graphics instructions received from the CPU 1510 and the vector unit 1515 to produce images for display on a display device (not shown). For example, the vector unit 1515 of FIG. 15 may transform objects from three-dimensional coordinates to two-dimensional coordinates, and send the two-dimensional coordinates to the graphics processing unit 1520. Furthermore, the sound processing unit 1560 executes instructions to produce sound signals that are outputted to an audio device such as speakers (not shown). Other devices may be connected to the entertainment system 1500 via the USB interface 1545, and the communication network interface 1550 such as wireless transceivers, which may also be embedded in the system 1500 or as a part of some other component such as a processor.

A user of the entertainment system 1500 of FIG. 15 provides instructions via the peripheral interface 1535 to the CPU 1510, which allows for use of a variety of different available peripheral devices (e.g., controllers) known in the art. For example, the user may instruct the CPU 1510 to store certain game information on the memory card 1540 or other non-transitory computer-readable storage media or instruct a character in a game to perform some specified action.

The present disclosure pertain to an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. Aspects of the present disclosure may also be implemented with cross-title neutrality and/or may be utilized across a variety of titles from various publishers.

Aspects of the present disclosure may be implemented in an application that may be operable using a variety of devices. Non-transitory computer-readable storage media refer to any medium or media that participate in providing instructions to a central processing unit (CPU) for execution.

Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as other network interfaces and network topologies to implement the same.

In some aspects of the present disclosure, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The foregoing detailed description of the technology has been presented for purposes of illustration and description. It is not intended to be exhaustive or to limit the technology to the precise form disclosed. Many modifications and variations are possible in light of the above teaching. The described aspects of the present disclosure were chosen in order to adequately explain the principles of the technology, its practical application, and to enable others skilled in the art to utilize the technology along with various modifications as are suited to the particular use contemplated. It is intended that the scope of the technology be defined by the claim.

What is claimed is:

1. A system for tracking an in-game digital asset, the system comprising:
    a memory; and
    a processor coupled to the memory, wherein execution by the processor of instructions stored in the memory causes the processor to:
        receive a request to update a history of the in-game digital asset to add a change to a property of the in-game digital asset while maintaining an asset type of the in-game digital asset, wherein the in-game digital asset is usable through a platform associated with a video game, wherein the asset type is one of a plurality of predetermined asset types that are usable through the platform associated with the video game;
        identify a distributed ledger that stores a non-fungible token representing the in-game digital asset, wherein the distributed ledger includes a plurality of blocks that store at least a portion of the history of the in-game digital asset represented as interactions with the non-fungible token, wherein respective instances of the distributed ledger are stored across a plurality of computing devices, wherein one of the plurality of computing devices includes the memory and the processor;
        generate a new block for the distributed ledger automatically in response to receiving the request to update the history of the in-game digital asset, wherein the new block is generated to include a payload identifying at least the change to the property of the in-game digital asset included in one or more updates to the history of the in-game digital asset, wherein the one or more updates to the history of the in-game digital asset are represented in the payload as one or more new interactions with the non-fungible token, wherein the new block is generated in part using a hash algorithm to also include a hash of at least a portion of a prior block of the distributed ledger; and
        append the new block to the plurality of blocks of the distributed ledger to update the respective instances of the distributed ledger across the plurality of computing devices.

2. The system of claim 1, wherein the non-fungible token includes a unique identifier and identifies the in-game digital asset.

3. The system of claim 2, wherein the non-fungible token identifies the in-game digital asset at least by including a pointer to a network location at which the in-game digital asset is stored.

4. The system of claim 3, wherein the pointer is a uniform resource indicator (URI), wherein the network location includes storage of the in-game digital asset on an interplanetary file system (IPFS).

5. The system of claim 2, wherein the non-fungible token includes metadata identifying one or more attributes of the in-game digital asset, wherein the distributed ledger stores the metadata.

6. The system of claim 2, wherein the non-fungible token includes a pointer to a network location that stores metadata identifying one or more attributes of the in-game digital asset, wherein the distributed ledger stores the pointer.

7. The system of claim 1, wherein the property of the in-game digital asset includes an in-game visual appearance of the in-game digital asset, wherein the change to the property of the in-game digital asset includes one or more changes to the in-game visual appearance of the in-game digital asset.

8. The system of claim 1, wherein the property of the in-game digital asset includes an in-game functionality of the in-game digital asset, wherein the change to the property of the in game digital asset includes one or more changes to the in-game functionality of the in-game digital asset.

9. The system of claim 1, wherein the property of the in-game digital asset includes an ownership of the in-game digital asset, wherein the change to the property of the in-game digital asset includes a change to the ownership of the in-game digital asset and the non-fungible token from a first owner account to a second owner account based on execution of one or more smart contracts.

10. The system of claim 1, wherein the property of the in-game digital asset includes a license for in-game use of the in-game digital asset, wherein the change to the property of the in game digital asset includes a grant of the license for in-game use of the in-game digital asset to one or more licensee accounts based on execution of one or more smart contracts and based on access to the non-fungible token.

11. The system of claim 1, wherein the request to update the history of the in-game digital asset is based on an indication of in-game use of the in-game digital asset for an in-game action, wherein the payload of the new block identifies the in-game action for which the in-game digital asset is used in-game.

12. The system of claim 1, wherein execution by the processor of the instructions causes the processor to:

create the distributed ledger associated with the in-game digital asset in response to receipt of an indication regarding creation of the in-game digital asset; and generate a first block of the distributed ledger, wherein a first payload of the first block begins the history of the in-game digital asset, wherein the plurality of blocks includes the first block.

13. The system of claim 12, wherein execution by the processor of the instructions causes the processor to:

create the non-fungible token corresponding to the in-game digital asset at least by generating a unique identifier for the non-fungible token and identifying the in-game digital asset in the non-fungible token, wherein the first payload of the first block begins the history of the in-game digital asset by referring to one or more first interactions with the non-fungible token.

14. The system of claim 1, wherein execution by the processor of the instructions causes the processor to:

create the in-game digital asset within the video game.

15. The system of claim 1, wherein execution by the processor of the instructions causes the processor to:

verify that the request to update the history of the in-game digital asset is valid, wherein generating the new block occurs in response to verifying that the request to update the history of the in-game digital asset is valid.

16. The system of claim 1, wherein the in-game digital asset is one of an in-game item, an in-game character, an in-game costume, and an in-game area.

17. A method for tracking an in-game digital asset, the method comprising:

receiving a request to update a history of the in-game digital asset to add a change to a property of the in-game digital asset while maintaining an asset type of the in-game digital asset, wherein the in-game digital asset is usable through a platform associated with a video game;

identifying a distributed ledger that stores a non-fungible token representing the in-game digital asset, wherein the distributed ledger includes a plurality of blocks that store at least a portion of the history of the in-game digital asset represented as interactions with the non-fungible token, wherein respective instances of the distributed ledger are stored across a plurality of computing devices;

generating a new block for the distributed ledger automatically in response to receiving the request to update the history of the in-game digital asset, wherein the new block is generated to include a payload identifying at least the change to the property of the in-game digital asset included in one or more updates to the history of the in-game digital asset, wherein the one or more updates to the history of the in-game digital asset are represented in the payload as one or more new interactions with the non-fungible token, wherein the new block is generated in part using a hash algorithm to also include a hash of at least a portion of a prior block of the distributed ledger; and appending the new block to the plurality of blocks of the distributed ledger to update the respective instances of the distributed ledger across the plurality of computing devices.

18. The method of claim 17, further comprising:

creating the distributed ledger associated with the in-game digital asset in response to receipt of an indication regarding creation of the in-game digital asset; and generating a first block of the distributed ledger, wherein a payload of the first block begins the history of the in-game digital asset, wherein the plurality of blocks includes the first block.

19. A non-transitory computer readable medium comprising instructions stored thereon, wherein execution of the instructions by one or more processors of a system for tracking an in-game digital asset cause the system to:

receive a request to update a history of the in-game digital asset to add a change to a property of the in-game digital asset while maintaining an asset type of the in-game digital asset, wherein the in-game digital asset is usable through a platform associated with a video game, wherein the asset type is one of a plurality of predetermined asset types that are usable through the platform associated with the video game;

identify a distributed ledger that stores a non-fungible token representing the in-game digital asset, wherein the distributed ledger includes a plurality of blocks that store at least a portion of the history of the in-game digital asset represented as interactions with the non-fungible token, wherein respective instances of the distributed ledger are stored across a plurality of computing devices;

generate a new block for the distributed ledger automatically in response to receiving the request to update the history of the in-game digital asset, wherein the new block is generated to include a payload identifying at least the change to the property of the in-game digital asset included in one or more updates to the history of the in-game digital asset, wherein the one or more updates to the history of the in-game digital asset are represented in the payload as one or more new interactions with the non-fungible token, wherein the new block is generated in part using a hash algorithm to also include a hash of at least a portion of a prior block of the distributed ledger; and append the new block to the plurality of blocks of the distributed ledger to update the respective instances of the distributed ledger across the plurality of computing devices.

20. The system of claim 1, wherein the in-game digital asset is equippable by a character in the video game.

* * * * *